(12) United States Patent
Blumenkranz et al.

(10) Patent No.: US 11,726,106 B2
(45) Date of Patent: *Aug. 15, 2023

(54) INTEGRATED FIBER BRAGG GRATING ACCELEROMETER IN A SURGICAL INSTRUMENT

(71) Applicant: Intuitive Surgical Operations, Inc., Sunnyvale, CA (US)

(72) Inventors: Stephen J. Blumenkranz, Los Altos Hills, CA (US); Lawton N. Verner, Saratoga, CA (US)

(73) Assignee: Intuitive Surgical Operations, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/448,068

(22) Filed: Sep. 20, 2021

(65) Prior Publication Data

US 2022/0074966 A1 Mar. 10, 2022

Related U.S. Application Data

(63) Continuation of application No. 16/455,611, filed on Jun. 27, 2019, now Pat. No. 11,137,414, which is a
(Continued)

(51) Int. Cl.
*G01P 15/093* (2006.01)
*G02B 6/34* (2006.01)
*G01L 1/22* (2006.01)

(52) U.S. Cl.
CPC .............. *G01P 15/093* (2013.01); *G02B 6/34* (2013.01); *G01L 1/2225* (2013.01)

(58) Field of Classification Search
CPC ....... G01P 15/093; G02B 6/34; G01L 1/2225; A61B 2034/2048; A61B 2562/0219
See application file for complete search history.

(56) References Cited

U.S. PATENT DOCUMENTS

| 4,299,230 | A | 11/1981 | Kubota |
| 4,430,895 | A | 2/1984 | Colton |

(Continued)

FOREIGN PATENT DOCUMENTS

| CN | 2772442 Y | 4/2006 |
| CN | 202105024 U | 1/2012 |

(Continued)

OTHER PUBLICATIONS

Au H.Y et al., "Fiber Bragg Grating Based Accelerometer," Proceeding of SPIE, 19th International Conference on Optical Fibre Sensors, 2008, vol. 7004, pp. 70042S-1 to 70042S-4.
(Continued)

*Primary Examiner* — Alexander A Mercado
*Assistant Examiner* — John M Royston

(57) ABSTRACT

An accelerometer is included within the confined space and limited volume of a distal portion of a surgical instrument. The surgical instrument includes an end component, a joint coupled to the end component, a shaft coupled to the joint, and a force transducer and accelerometer apparatus. The force transducer and accelerometer apparatus is coupled between the joint and the shaft. The force transducer and accelerometer apparatus includes a force sensor and an accelerometer. The accelerometer includes an optic fiber having a Fiber Bragg Grating. Information acquired from the Fiber Bragg Grating is used to drive a vibro-tactile haptic feedback output device coupled to a master control arm surgeon grip.

14 Claims, 12 Drawing Sheets

Related U.S. Application Data continuation of application No. 15/727,241, filed on Oct. 6, 2017, now Pat. No. 10,365,295, which is a continuation of application No. 14/540,313, filed on Nov. 13, 2014, now Pat. No. 9,817,019.

(60) Provisional application No. 61/903,874, filed on Nov. 13, 2013.

(56) References Cited

U.S. PATENT DOCUMENTS

| | | |
|---|---|---|
| 4,799,752 A | 1/1989 | Carome |
| 5,599,348 A | 2/1997 | Gentelia et al. |
| 5,892,860 A | 4/1999 | Maron et al. |
| 6,424,885 B1 | 7/2002 | Niemeyer et al. |
| 6,552,469 B1 | 4/2003 | Pederson et al. |
| 6,620,174 B2 | 9/2003 | Jensen et al. |
| 6,994,703 B2 | 2/2006 | Wang et al. |
| 8,016,818 B2 | 9/2011 | Ellis et al. |
| 8,375,808 B2 | 2/2013 | Blumenkranz et al. |
| 8,840,628 B2 | 9/2014 | Green et al. |
| 8,881,597 B2 | 11/2014 | Jost et al. |
| 8,887,595 B2 | 11/2014 | Williams et al. |
| 8,911,471 B2 | 12/2014 | Spivey et al. |
| 8,918,212 B2 | 12/2014 | Larkin et al. |
| 9,817,019 B2 | 11/2017 | Blumenkranz et al. |
| 9,952,107 B2 | 4/2018 | Blumenkranz et al. |
| 10,365,295 B2 | 7/2019 | Blumenkranz et al. |
| 10,378,883 B2 | 8/2019 | Gifford et al. |
| 10,470,796 B2 | 11/2019 | Page et al. |
| 10,791,908 B2 | 10/2020 | Au |
| 11,137,414 B2 | 10/2021 | Blumenkranz et al. |
| 2006/0167440 A1* | 7/2006 | Cooper ............ A61B 34/30 606/1 |
| 2006/0178559 A1 | 8/2006 | Kumar et al. |
| 2006/0235314 A1 | 10/2006 | Migliuolo et al. |
| 2007/0052496 A1 | 3/2007 | Niemeyer et al. |
| 2007/0078484 A1 | 4/2007 | Talarico et al. |
| 2007/0151391 A1* | 7/2007 | Larkin ............ A61B 34/76 74/490.06 |
| 2009/0021752 A1 | 1/2009 | Cohen et al. |
| 2009/0157092 A1 | 6/2009 | Blumenkranz et al. |
| 2010/0036384 A1 | 2/2010 | Gorek et al. |
| 2010/0063478 A1 | 3/2010 | Selkee |
| 2010/0087835 A1 | 4/2010 | Blumenkranz et al. |
| 2010/0210975 A1 | 8/2010 | Anthony, III et al. |
| 2010/0250000 A1 | 9/2010 | Blumenkranz et al. |
| 2010/0313679 A1* | 12/2010 | Larkin ............ A61B 34/71 73/862.045 |
| 2011/0178477 A1 | 7/2011 | Morel et al. |
| 2012/0016362 A1 | 1/2012 | Heinrich et al. |
| 2012/0257208 A1 | 10/2012 | Andersen et al. |
| 2012/0310257 A1 | 12/2012 | Kuchenbecker et al. |
| 2013/0291654 A1 | 11/2013 | Blumenkranz et al. |
| 2015/0150635 A1 | 6/2015 | Kilroy et al. |
| 2015/0374447 A1 | 12/2015 | Blumenkranz et al. |
| 2016/0216167 A1 | 7/2016 | Blumenkranz et al. |
| 2018/0078249 A1 | 3/2018 | Stoy et al. |
| 2020/0046404 A1 | 2/2020 | Page et al. |
| 2021/0401523 A1 | 12/2021 | Suresh |

FOREIGN PATENT DOCUMENTS

| | | |
|---|---|---|
| CN | 102697559 A | 10/2012 |
| EP | 1704822 A1 | 9/2008 |
| EP | 2431000 A2 | 3/2012 |
| EP | 3549538 A1 | 10/2019 |
| JP | 2007528238 A | 10/2007 |
| WO | WO-2007143859 A1 | 12/2007 |
| WO | WO-2016018815 A1 | 2/2016 |
| WO | WO-2020102774 A1 | 5/2020 |
| WO | WO-2021236505 A1 | 11/2021 |

OTHER PUBLICATIONS

Baldwin C., et al., "Review of Fiber Optic Accelerometers," 23rd Conference and Exposition on Structural Dynamics 2005—IMAC—XXIII, 2005, 7 pages.

Basumallick N., et al., "Fiber Bragg Grating Accelerometer with Enhanced Sensitivity," Sensors and Actuators A: Physical, Nov. 11, 2011, vol. 173, pp. 108-115.

Callaghan D., et al., "Force Measurement Methods in Telerobotic Surgery; Implications for End-Effector Manufacture," Proceedings of the 25th International Manufacturing Conference, Dublin Institute of Technology, 2008, pp. 389-398.

Cazo R.M., et al., "Proposed Interrogation System Applied to a FBG Opto-Mechanical Accelerometer," Annals of Optics, ENFMC, vol. 5-2003, 5 pages.

Fender A., et al., "Two-Axis Temperature-Insensitive Accelerometer Based on Multicore Fiber Bragg Gratings," IEEE Sensors Journal, 2098, vol. 8 (7), pp. 1292-1298.

Jiang Q., et al., "A High Sensitivity Vector Accelerometer Based on Tri-Axial Fiber Bragg Grating," Optica Applicata, 2012, vol. 42 (4), pp. 901-912.

Latt W.T., et al., "A Study of a Hand-Held Instrument's Angular Motion Due to Physiological Tremor in Micromanipulation Tasks," 30th Annual International IEEE EMBS Conference, 2008, pp. 1952-1955.

Latt W.T., et al., ""Placement of Accelerometers for High Sensing Resolution in Micromanipulation,"" Sensors and Actuators A: Physical, NIH Public Access, 2011, vol. 167 (2), pp. 304-316.

Li L., et al., "Temperature-Independent Acceleration Measurement with a Strain-Chirped Fiber Bragg Grating," Optoelectronics and Advanced Materials—Rapid Communications, 2010, vol. 4 (7), pp. 943-946.

Long L., "Multi-Axis Fiber Bragg Grating Accelerometer," Electrical and Computer Engineering, Dalhousie University, 2010, 85 pages.

Mcmahan W., et al., "A Practical System for Recording Instrument Interactions During Live Robotic Surgery," University of Pennsylvania, Philadelphia, PA, USA, 5 pages.

Morikawa, S.R.K., et al., "Temperature Compensated Fiber Bragg Grating Accelerometer," SEM Annual Conference & Exposition on Experimental and Applied Mechanics, 2005, 8 pages.

Placement of Accelerometers for High Sensing Resolution in Micromanipulation, 1 page, [online], [retrieved Sep. 1, 2011]. Retrieved from the Internet: [URL:http://www.citeulike.org/article/9007986].

Ryan E.S., et al., "Vibrotactile force Feedback System for Minimally Invansive Surgical Procedures," IEEE International Conference on Systems, Man, and Cybernetics, Oct. 11, 2006, pp. 2464-2469.

Seibold U., et al., "Prototype of Instrument for Minimally Invasive Surgery with 6-Axis Force Sensing Capability," Proceedings of the 2005 IEEE International Conference on Robotics and Automation Barcelona, Spain, Apr. 2005, pp. 498-503.

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

Wellman, Parris et al., "Towards Realistic Vibrotactile Display in Virtual Environments," 1995, 24 pages.

Weng Y., et al., "Compact FBG Diaphragm Accelerometer Based on L-Shaped Rigid Cantilever Beam," Chinese Optics Letters, 2011, vol. 9 (10), pp. 100604-1-100604-4.

Yao H.Y., et al., "A Tactile Magnification Instrument for Minimally Invasive Surgery," Medical Image Computing and Computer Assisted Intervention, Springer-Verlag Berlin Heidelberg, 2004, pp. 89-96.

Zhu, Y., et al., "Temperature insensitive measurements of static displacements using a fiber Bragg grating," Optics Express, vol. 11, No. 16, pp. 1918-1924, Aug. 11, 2003.

Zhu, Y., et al., "Temperature-Insensitive Fiber Bragg Grating Accelerometer," IEEE Photonics Technology Letters, vol. 15, No. 10, pp. 1437-1439, Oct. 2003.

* cited by examiner

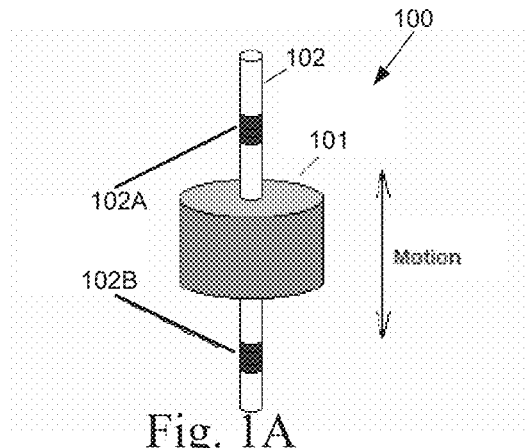
Fig. 1A
(Prior Art)
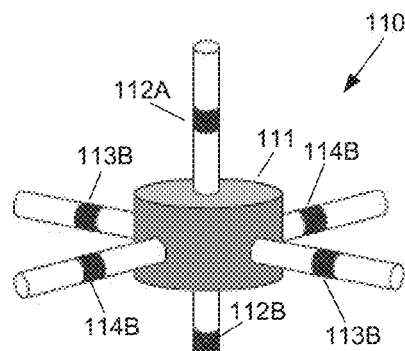
Fig. 1B
(Prior Art)
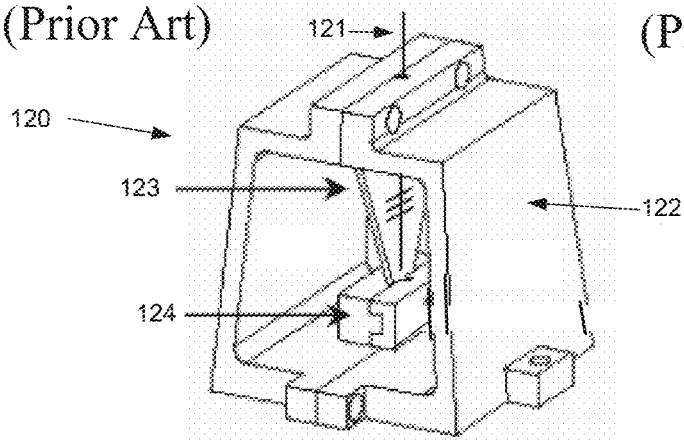
Fig. 1C
(Prior Art)
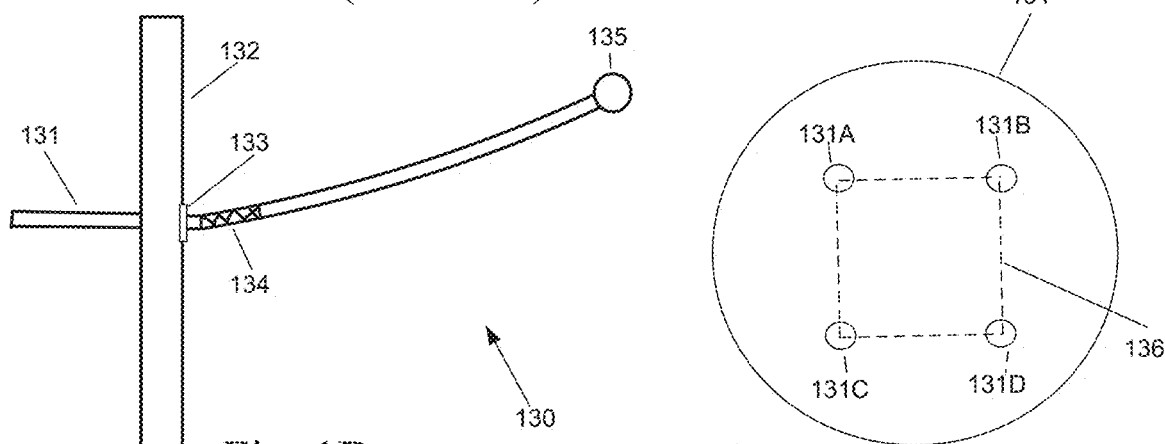
Fig. 1D
(Prior Art)
Fig. 1E
(Prior Art)

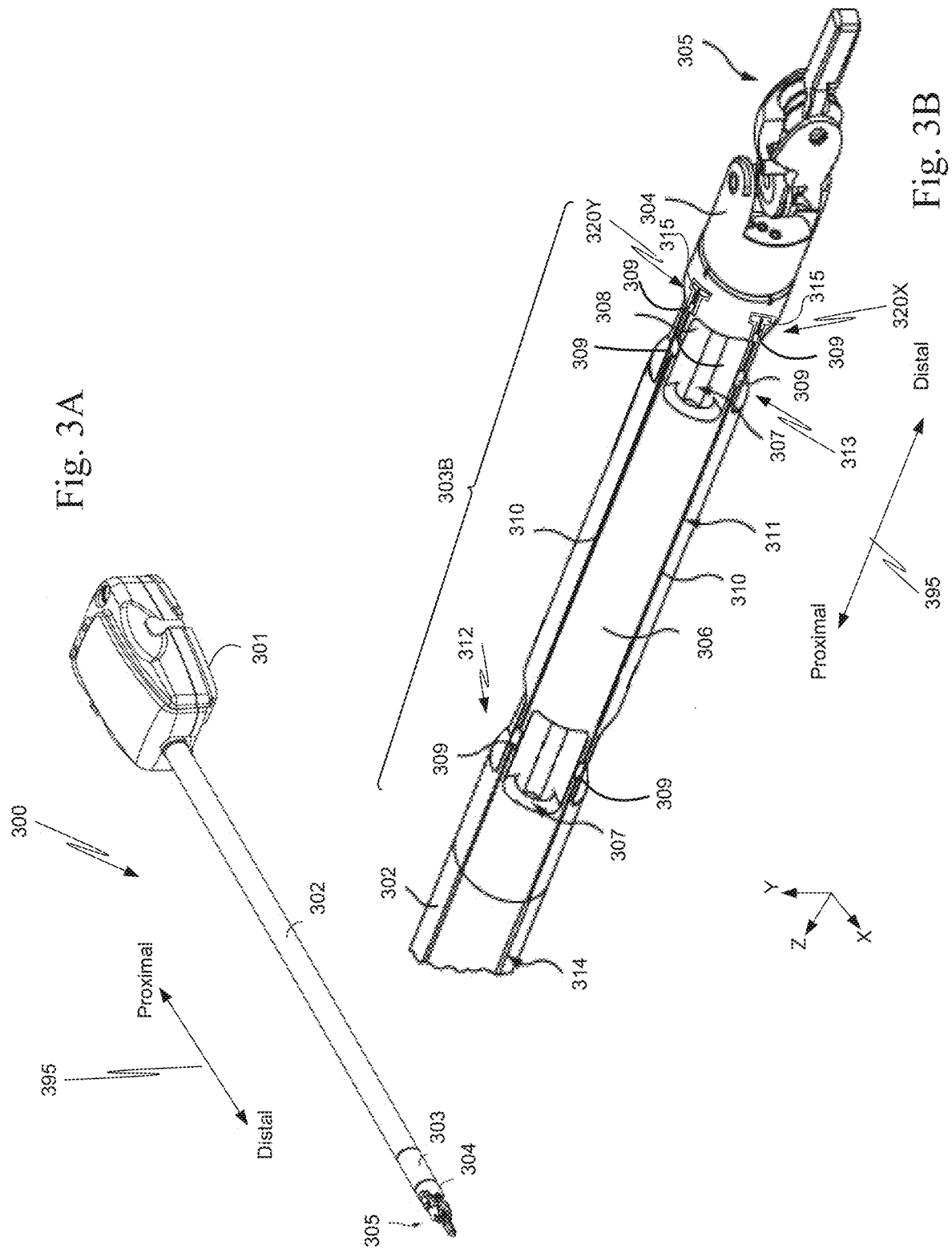

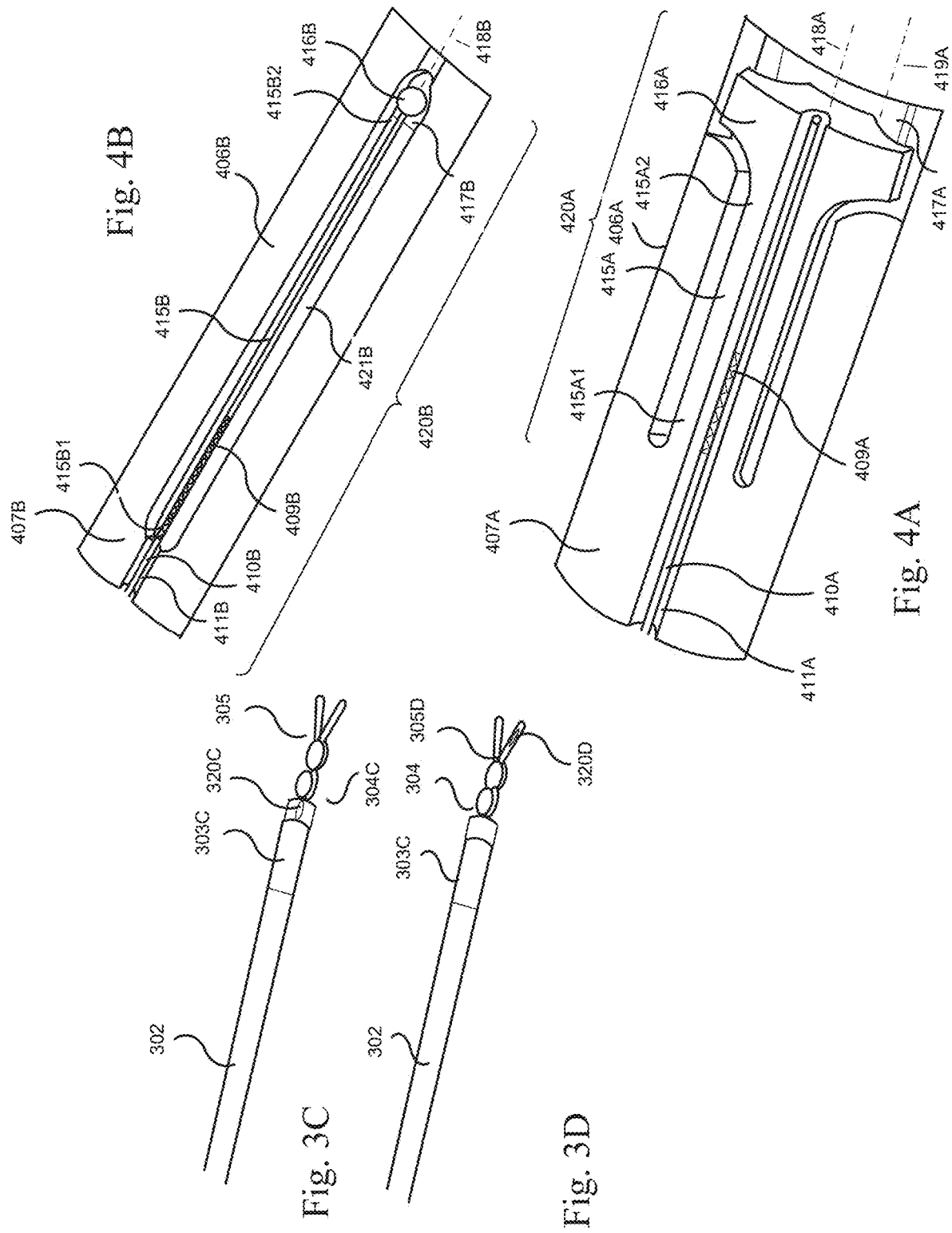

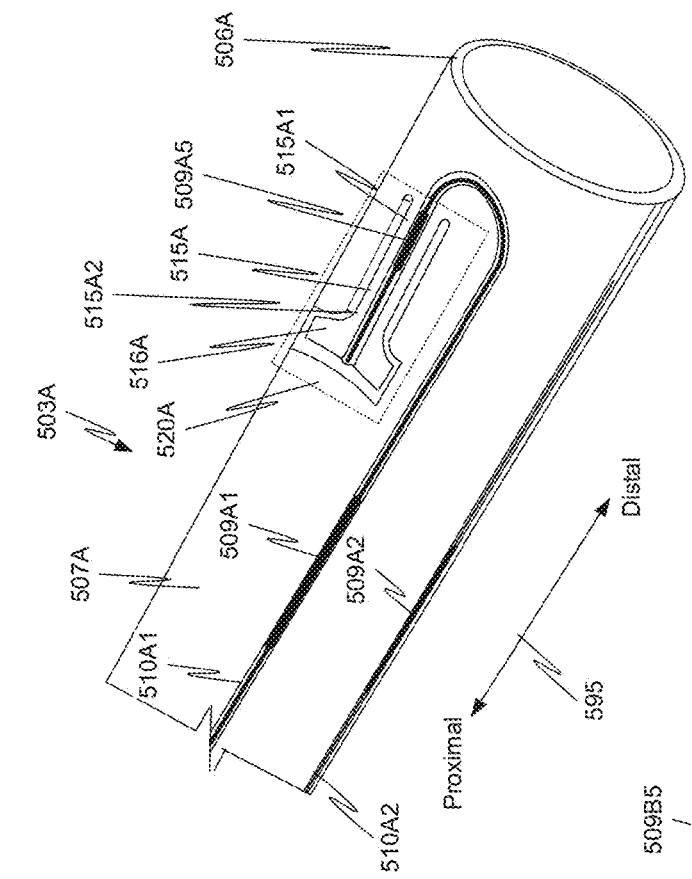
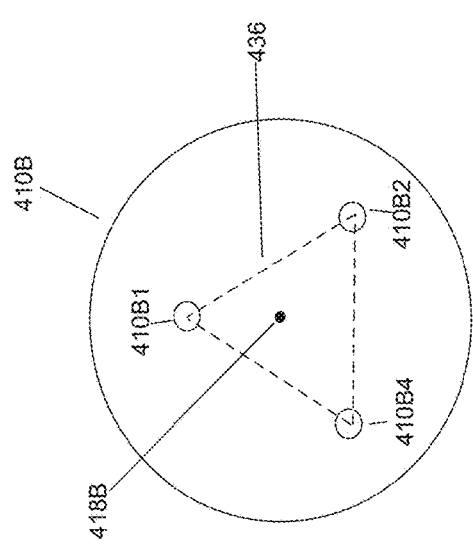
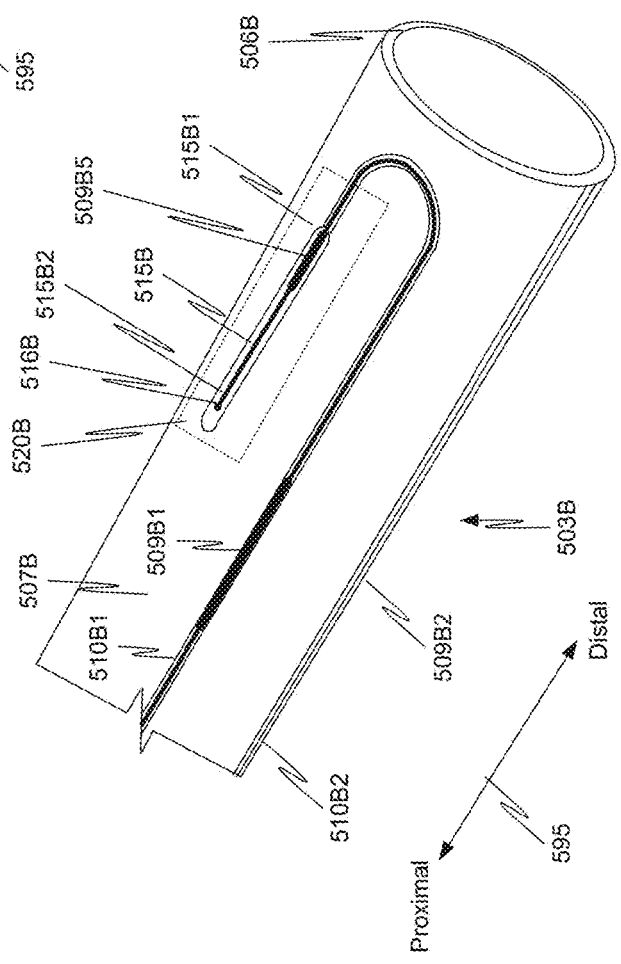
Fig. 5A
Fig. 4C
Fig. 5B

INTEGRATED FIBER BRAGG GRATING ACCELEROMETER IN A SURGICAL INSTRUMENT

CROSS REFERENCE TO RELATED APPLICATIONS

This application is a continuation of U.S. patent application Ser. No. 16/455,611 (filed 27 Jun. 2019), which is a continuation of U.S. patent application Ser. No. 15/727,241 (filed 6 Oct. 2017), which is a continuation of U.S. patent application Ser. No. 14/540,313 (filed 13 Nov. 2014), which claims priority to and the benefit of U.S. Patent Application No. 61/903,874 (filed 13 Nov. 2013), the full disclosures of each which are incorporated herein by reference for all purposes.

BACKGROUND

Field of Invention

Aspects of this invention are related to surgical instruments, and are more particularly related to an accelerometer mounted on a surgical instrument.

Related Art

Accelerometers are widely used to measure shocks and vibrations. Fiber optic accelerometers are known and are in commercial use. In particular, fiber optic accelerometers that utilize Fiber Bragg Grating have been developed. Generally, prior Fiber Bragg Grating (FBG) accelerometers are of three types-axial FBG accelerometers, flexural FBG accelerometers, and hybrids of axial and flexural accelerometers.

FIG. 1A illustrates a first example of an axial FBG accelerometer 100. A pre-tensioned optic fiber 102 includes two FBGs 102A, 102B. A mass 101 is affixed to optic fiber 102 and positioned between FBGs 102A and 102B. The inertial reaction of mass 101 to a shock causes FBGs 102A and 102B to stretch or un-stretch in response to accelerations of the mass along the direction of optic fiber 102. FBGs 102A, 102B are located along the measurement axis of accelerometer 100, and are read differentially to provide temperature compensation.

An axial FBG accelerometer can have accelerometers positioned on one, two, or three axes. For example, FIG. 1B shows a tri-axial accelerometer 110. A mass 111 is positioned between FBGs 112A and 112B in a first pre-tensioned optic fiber extending along a z-axis. Mass 111 is positioned between FBGs 113A and 113B in a second pre-tensioned optic fiber extending along an x-axis. Mass 111 is positioned between FBGs 114A and 114B in a third pre-tensioned optic fiber extending along a y-axis. Each pair of FBGs along an axis functions in the same way as the pair of FBGs in FIG. 1A.

FIGS. 1C and 1D are illustrations of examples of flexural FBG accelerometers. In a flexural FBG accelerometer, a FBG attached to a flexural beam stretches or compresses as the flexural beam flexes in response to accelerations of the inertial mass of the flexural beam or a mass mounted on the beam exerting forces transverse to the fiber and the flexural beam.

In flexural FBG accelerometer 120, a first end of a tapered isosceles plate 123 is clamped to an external frame 122 of accelerometer 120. A second end of tapered plate 123 is affixed to a seismic mass 123. A single optic fiber 121 extends through an opening in external frame 122, and is bonded to tapered plate 123 with an epoxy resin. The portion of optic fiber 121 bonded to tapered plate includes a FBG. Thus, as seismic mass 123 moves, tapered plate 123 is flexed, which in turn causes the FBG to stretch and un-stretch.

In another example of a flexural FBG accelerometer 130 (FIG. 1D), a portion of a single multi-core fiber 131 extends from a clamp 133. Fiber 131 is affixed to clamp 133 that in turn is affixed to an end of a main sensor housing 132. Only a portion of the main sensor housing is shown in FIG. 1D. FBGs 134 are included in the cores of fiber 131 and positioned just outside collar 133. A mass 135 is attached to the unsupported end of fiber 131. Thus, the portion of fiber 131 with FBGs 134 that extends from collar 133 is a cantilever beam.

FIG. 1E is a cross-sectional illustration of cores 131A, 131B, 131C, 131D of fiber 131. Each of four cores 131A, 131B, 131C, 131D is positioned at a different vertex of a square 136. The relative stretch and compression of FBGs in opposite cores of the fiber are measured to determine the bending of fiber 131 in response to accelerations of mass 135.

The third type of accelerometer (FIG. 1F) is a hybrid of the two former types of accelerometers. Hybrid accelerometer 140 includes a mass 141 on the end of a beam 142. The combination of mass 141 and beam 142 acts via a bell crank or lever to apply an axial load to stretch or un-stretch FBG 144 in optic fiber 143 in a manner similar to the axial accelerometers described above.

The accelerometers described above are suitable for use in industrial applications. However, in a teleoperated surgical application, a FBG based accelerometer was not used. Instead, a micro-electro-mechanical system (MEMS) accelerometer was used.

FIG. 1G is an illustration of a patient side cart 150 of a teleoperated surgical system. An instrument manipulator 152 is positioned at a distal end of a setup arm 151. A sterile adapter is mounted on instrument manipulator 152 and then a surgical instrument is mounted on the sterile adapter and instrument manipulator 152 combination. A MEMS accelerometer apparatus 155 is mounted just distal of a housing 154 of surgical instrument 153 on the distal portion of a surgical instrument manipulator 152.

Thus, considering the confined space and limited volume of the distal end of the surgical instrument tube of surgical instrument 153, MEMS accelerometer apparatus 155 was mounted external to a patient and external to the surgical instrument tube of surgical instrument 153. The surgical instrument tube of surgical instrument 153 is sometimes referred to as a shaft. MEMS accelerometer apparatus 155 is positioned external to the proximal end of the surgical instrument tube of surgical instrument 153. Also, a MEMS accelerometer was used in the teleoperated surgical application instead of the FBG accelerometers that be may be used in industrial applications.

SUMMARY

In one aspect, an accelerometer is included within the confined space and limited volume of a distal portion of a surgical instrument. For example, an apparatus includes a surgical instrument. The surgical instrument includes an end component, a joint coupled to the end component, a shaft coupled to the joint, and an accelerometer positioned adjacent to and proximal to the joint.

In this aspect, the accelerometer includes a cantilever beam and an optic fiber. The optic fiber includes a Fiber Bragg Grating, and the optic fiber is affixed to the cantilever beam. In one aspect, the accelerometer is included in a distal portion of the shaft.

In another aspect, the surgical instrument includes a force transducer. The force transducer includes the accelerometer, and the force transducer is mounted between a distal end of the shaft and the joint. Here, the optic fiber includes a second Fiber Bragg Grating. The second Fiber Bragg Grating is included in the force transducer, and the second Fiber Bragg Grating is positioned in the optic fiber between a proximal end of the optic fiber and the first Fiber Bragg Grating. The second Fiber Bragg Grating is used in measuring a force on the distal end of the surgical instrument.

In the accelerometer, the Fiber Bragg Grating is mounted on the cantilever beam a distance from a neutral axis of bending of the combination of the cantilever beam and the optic fiber. In a further aspect, the cantilever beam has a first modulus of elasticity. The optic fiber has a second modulus of elasticity. In one aspect, the first modulus of elasticity is about equal to the second modulus of elasticity. However, in other aspects, the first modulus of elasticity can be up to three times the second modulus of elasticity.

The accelerometer includes a mass positioned at a free end of the cantilever beam. In one aspect, the mass is formed integrally with the cantilever beam. The cantilever beam is configured to deflect, in response to acceleration during a surgical procedure, a distance sufficient to strain the Fiber Bragg Grating so that the Fiber Bragg Grating generates a measurable signal corresponding to the strain induced by acceleration of the mass. The cantilever beam also is configured to have a first mechanical resonance peak high enough to be sufficient to permit measurement of the acceleration and to avoid creating an unstable feedback around a low frequency force output device included in the apparatus. In one aspect, the accelerometer includes a travel stop configured to limit deflection of the cantilever beam.

The apparatus also includes a master control device coupled to the surgical instrument, and a vibro-tactile haptic output device coupled to the accelerometer and to the master control device. The vibro-tactile haptic output device is configured to output momentary transient information and sustained time varying strain information acquired from the accelerometer either separately or in combination with the master control device.

The apparatus also includes a filter positioned after the accelerometer and before a vibro-tactile haptic output device and/or master control device. The filter is configured to limit the bandwidth of frequencies output via the vibro-tactile haptic output device and/or the master control device. Optionally, the apparatus includes a sound system coupled to the accelerometer. The sound system is configured to generate an audible acoustic signal corresponding to the transient information and the sustained time varying strain information acquired from the accelerometer either separately or in combination.

Another aspect of the apparatus also includes a surgical instrument. The surgical instrument includes an end component, a joint coupled to the end component, a shaft coupled to the joint, and an accelerometer positioned adjacent to and proximal to the joint.

The accelerometer is coupled to a distal portion of the shaft. The accelerometer includes a portion of a tube body and an optic fiber. The optic fiber includes a first portion and a second portion. The first portion of the optic fiber is fixedly attached to the portion of the tube body. The second portion of the optic fiber is configured as a cantilever beam. The second portion of the optic fiber includes the Fiber Bragg Grating, and the second portion of the optic fiber extends from the first portion of the optic fiber. In one aspect, the tube body is a distal portion of the shaft.

In one aspect, the tube body is a tube body of a force transducer. The force transducer is positioned between the distal end of the shaft and the joint. The optic fiber further includes a second Fiber Bragg Grating. The second Fiber Bragg Grating is included in the force transducer, and the second Fiber Bragg Grating is positioned between a proximal end of the optic fiber and the first portion of the optic fiber. The second Fiber Bragg Grating is used in measuring a force on the distal end of the surgical instrument.

In one aspect, the accelerometer includes a mass attached to a free end of the second portion of the optic fiber. The second portion of the optic fiber is configured to deflect, in response to acceleration during a surgical procedure, a distance sufficient to strain the first Fiber Bragg Grating so that the first Fiber Bragg Grating generates a measurable signal corresponding to the strain induced by the acceleration of the mass. The second portion of the optic fiber also is configured to have a first mechanical resonance peak high enough to be sufficient to permit measurement of the acceleration and to avoid creating an unstable feedback around a force output device included in the apparatus.

In another aspect, the portion of the tube body includes an aperture. The second portion of the optic fiber and the mass are positioned in the aperture. In some aspects, the accelerometer also includes a travel stop configured to limit deflection of the cantilever beam.

The apparatus also includes a master control device coupled to the surgical instrument, and a vibro-tactile haptic output device coupled to the accelerometer and to the master control device. The vibro-tactile haptic output device is configured to output transient information and sustained time varying strain information acquired from the accelerometer either separately or in combination on the master control device.

The apparatus also includes a filter positioned after the accelerometer and before the vibro-tactile haptic output device and/or master control device. The filter is configured to limit the bandwidth of frequencies output via the vibro-tactile haptic output device and/or master control device. Optionally, the apparatus includes a sound system coupled to the accelerometer. The sound system is configured to generate an audible acoustic signal corresponding to the transient information and the sustained time varying strain information acquired from the accelerometer either separately or in combination.

BRIEF DESCRIPTION OF THE DRAWINGS

FIG. 1A illustrates a prior art axial Fiber Bragg Grating accelerometer.

FIG. 1B illustrates a prior art tri-axial Fiber Bragg Grating accelerometer.

FIGS. 1C and 1D illustrate examples of prior art flexural Fiber Bragg Grating accelerometers.

FIG. 1E is a cross-sectional illustration of the optic fiber in the accelerometer of FIG. 1D.

FIG. 3A is a perspective illustration of a surgical instrument that includes a force sensor and accelerometer apparatus at a distal portion of the surgical instrument.

FIG. 3B is an enlarged diagram of one aspect of force sensor and accelerometer apparatus of FIG. 3A.

FIG. 3C is an illustration of a portion of another surgical instrument that includes the accelerometer on a joint.

FIG. 3D is an illustration of a portion of yet another surgical instrument that includes the accelerometer on an end component.

FIG. 4A is an illustration of a portion of a surgical instrument body that includes an accelerometer with a cantilever beam and an optic fiber affixed to the cantilever beam. The optic fiber includes a Fiber Bragg Grating positioned near the fixed end of the cantilever beam.

FIG. 4B is an illustration of a portion of a surgical instrument body that includes an accelerometer with an optic fiber including Bragg Fiber Gratings configured as a cantilever beam.

FIG. 4C is a cross-sectional illustration of the optic fiber in the accelerometer of FIG. 4B.

FIG. 5A is an alternative implementation of the accelerometer of FIG. 4A.

FIG. 5B is an alternative implementation of the accelerometer of FIG. 4B.

Figure 1F:
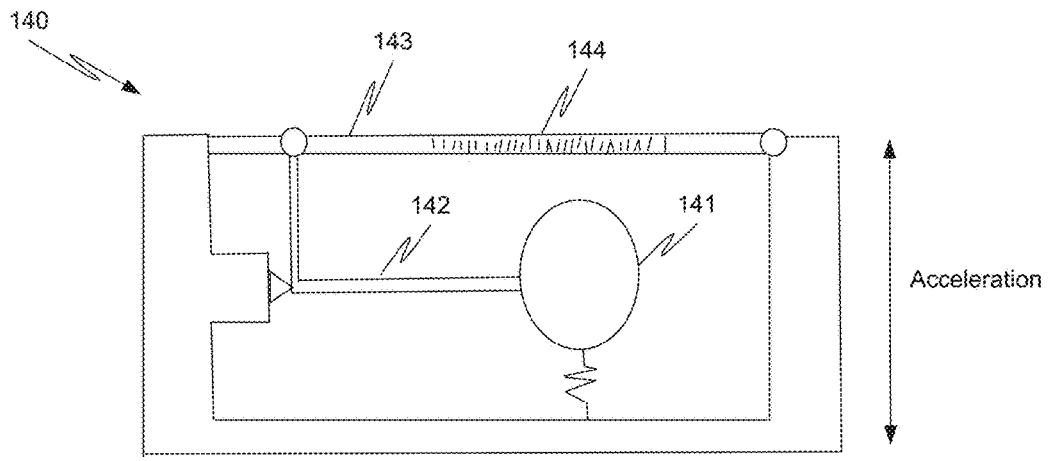
FIG. 1F illustrates a prior art hybrid Fiber Bragg Grating accelerometer.
Figure 1G:
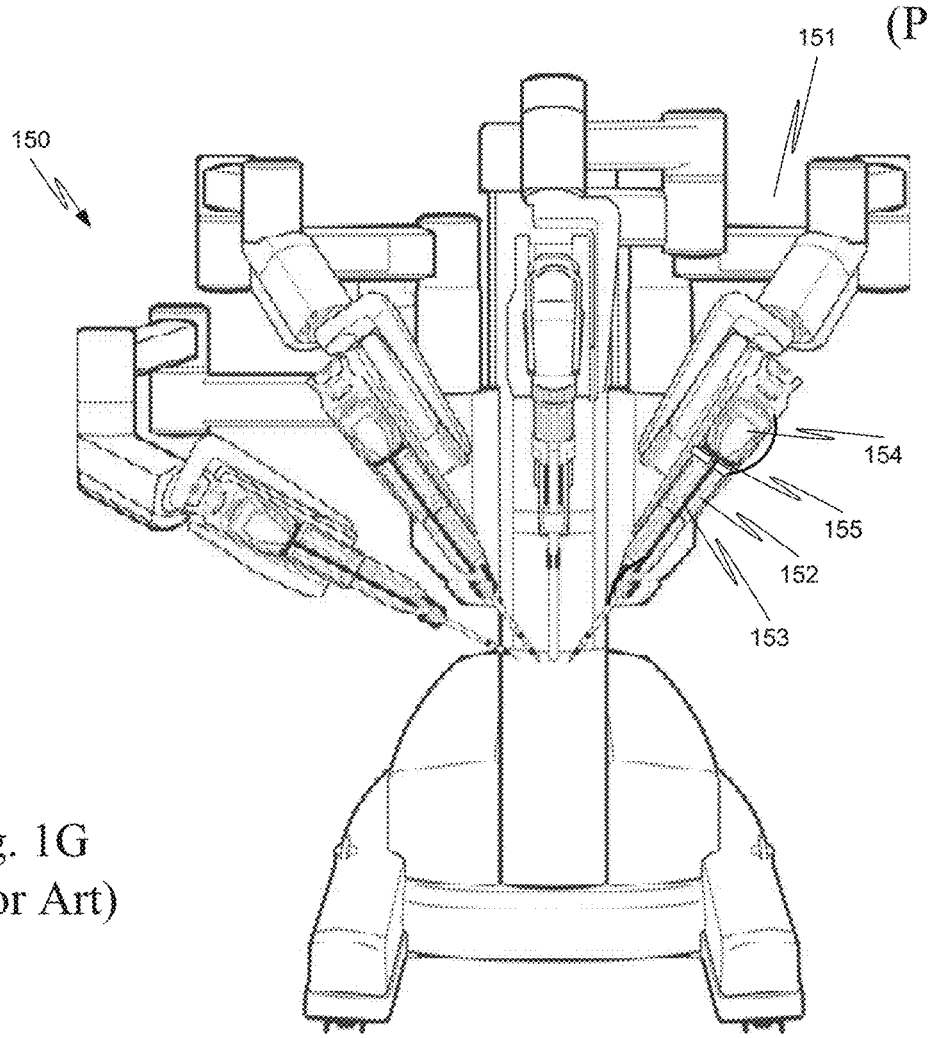
FIG. 1G illustrates a prior art patient side cart of a teleoperated surgical system that includes a surgical instrument with a MEMS accelerometer positioned near a distal portion of the surgical instrument manipulator.

In the drawings, the first digit of a reference numeral indicates the figure number in which an element having that reference numeral first appears.

DETAILED DESCRIPTION

In one aspect of this invention, a small accelerometer is included on a distal portion of a surgical instrument. Unlike MEMS accelerometers that have been previously used on a part of a surgical instrument manipulator that is external to a patient and well removed from the distal end of the surgical instrument, the accelerometer is positioned near or on the distal tip of the surgical instrument. Thus, during a clinical procedure, the accelerometer is positioned within the patient near the source of the interaction between the teleoperated surgical instrument and the surgical working environment that produces the high frequency content that excites the accelerometer.

Herein, two frequency ranges are of interest. The first frequency range includes low frequency content (zero to thirty Hertz (Hz)) associated with interactions between the teleoperated surgical instrument and the surgical working environment. The second frequency range includes high frequency content (thirty to one thousand Hz) associated with the interaction between the teleoperated surgical instrument and the surgical working environment.

The high frequency content detected by the accelerometer is filtered and vibro-tactile feedback is provided to the person operating the surgical instrument, and in some instances to others in the operating theater. For example, the master tool grip used to operate the slave surgical instrument is vibrated in direct correlation to the high frequency content detected by the accelerometer.

This feedback enables a surgeon to experience the interaction between the teleoperated surgical instrument and the surgical working environment, including for example, a suture needle being handed between instruments, a needle being passed thru tissue, incidental contact between instruments, and the like. The high frequency content may also be thought of as clicks, bumps or momentary forces and impacts as opposed to smoother, slower changing or sustained forces associated with the low frequency content. The high frequency content of the interaction between the teleoperated surgical instrument and the surgical working environment includes sustained time varying information as well as shorter transient information.

The higher frequency content of mechanical interactions is better sensed by an accelerometer than a force sensor. The high frequency content of the interaction between the teleoperated surgical instrument and the surgical working environment is output to the surgeon by, for example, the inertial reaction force of a voice coil moving a small counter mass closely coupled to a master tool grip. (See FIG. 9) The surgeon grasps the master tool grip to move the teleoperated surgical instrument. The high frequency content of the interaction between the teleoperated surgical instrument and the surgical working environment is distinct from the lower frequency content that is better suited to be output to the surgeon by forces exerted on his/her hands by the master control arm to which the master tool grip is attached.

While the use of accelerometers and in particular Fiber Bragg Grating accelerometers were known, their use was typically in industrial applications that were not constrained by the space, size, and environmental constraints associated with the distal end of a surgical instrument. As discussed above, the use of any accelerometer on the distal end of a surgical instrument apparently was considered infeasible, because a MEMS accelerometer apparatus was used near the proximal end of the surgical instrument.

There is very little available volume at the distal end of a surgical instrument and any wiring must be routed alongside the cables used to actuate the surgical instrument. In addition to the mechanical forces associated with the actuation cables, there is strong electrical interference associated with the use of cautery. Also, there may be thermal gradients as the illumination used in the surgery may heat only one side of the instrument.

In one aspect, a Fiber Bragg Grating accelerometer is positioned on the distal portion of the surgical instrument, e.g., proximal to a wrist joint of the surgical instrument. In one aspect, the Fiber Bragg Grating accelerometer takes advantage of optic fibers routed to the distal end of the surgical instrument for low frequency force sensing. The Fiber Bragg Grating accelerometer is immune to electric noise, and since the output of the accelerometer is high pass filtered, slower or DC temperature effects on the performance of the Fiber Bragg Grating are not of concern.

In one aspect, as described more completely below, an optic fiber used in low frequency force sensing is extended and mounted on a cantilever beam, or alternatively the optic fiber itself functions as the cantilever beam. When a cantilever beam is used, a Fiber Bragg Grating in the optic fiber is positioned near a first end of the cantilever beam and at a second end of the cantilever beam typically is a mass. The first end of the cantilever beam is fixed in place and so is referred to as the fixed end of the cantilever beam. The second end of the cantilever beam is not fixed in place and is free to move. Thus, the second end of the cantilever beam is referred to as the free end of the cantilever beam.

High frequency content of the interaction between the teleoperated surgical instrument and the surgical working environment causes the mass on the second end of the cantilever beam to move. The movement of the mass flexes the cantilever beam, which is turn strains the Fiber Bragg Grating. The strain in the Fiber Bragg Grating causes a location of a centerline of a light wavelength peak reflected by the Fiber Bragg Grating to shift from the location of the centerline when the Fiber Bragg Grating is unstrained. The shift of the centerline location is converted to strain information. The strain information is used to provide vibro-tactile feedback to the surgeon, as explained below, on the high frequency content of the interaction between the teleoperated surgical instrument and the surgical working environment.

Figure 2:
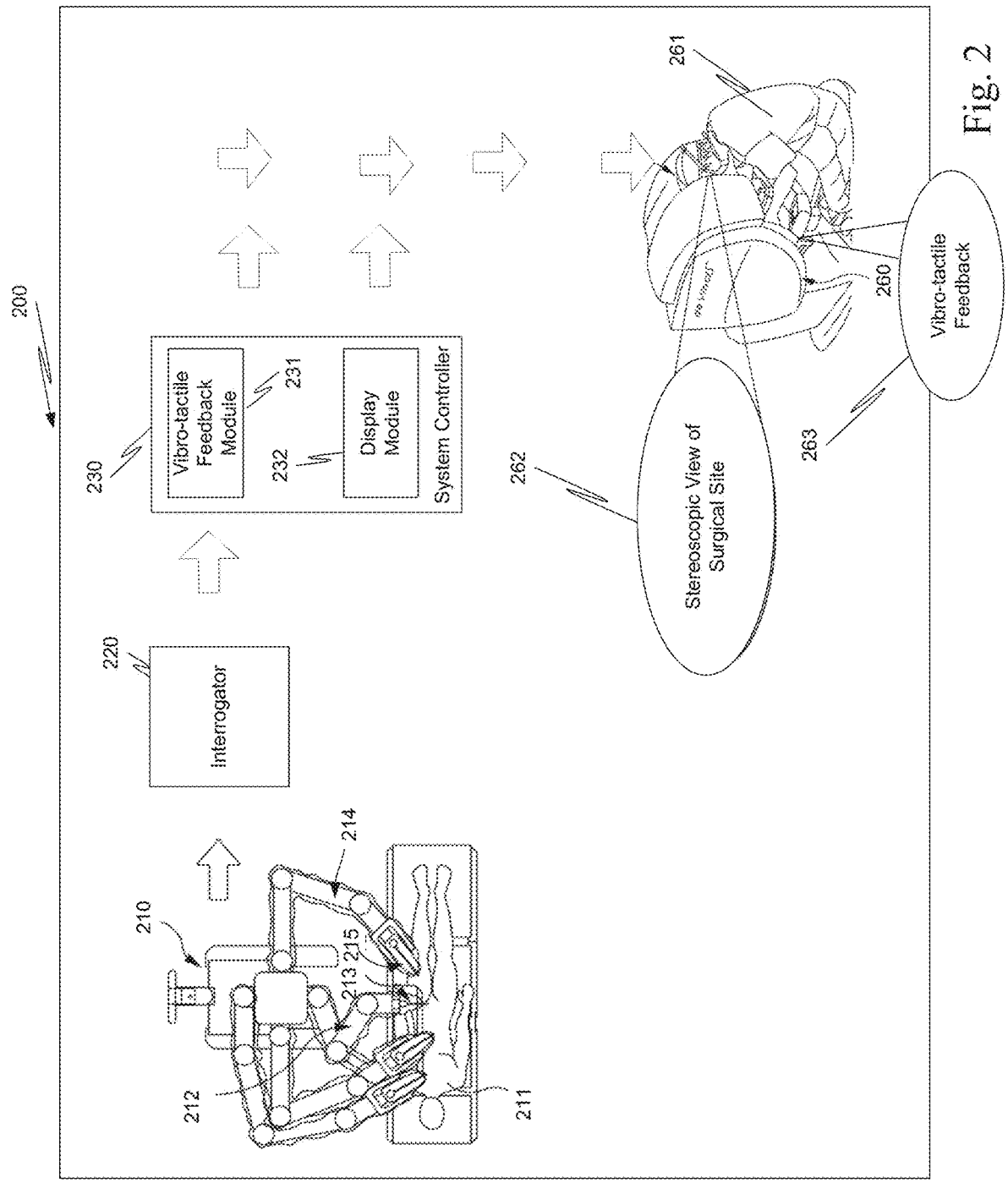
FIG. 2 is a high-level diagrammatic view of a teleoperated surgical system including an accelerometer mounted on a distal portion of a surgical instrument and including vibro-tactile feedback.

FIG. 2 is a high-level diagrammatic view of a teleoperated surgical system 200, for example, the minimally invasive teleoperated da Vinci® Surgical System, including an accelerometer mounted on a distal portion of surgical instrument 215. (da Vinci® is a registered trademark of Intuitive Surgical, Inc. of Sunnyvale, Calif.) The accelerometer in not shown because the distal portion of surgical instrument 215 that includes the accelerometer is within patient 211.

In this example, a surgeon, using master controls at a surgeon's console 260, remotely manipulates an endoscope 212 mounted on a teleoperated manipulator arm 213 of patient-side cart 210. The surgeon also can remotely manipulate one or more surgical instruments mounted on teleoperated arms of patient-side cart 210. The surgical instruments include surgical instrument 215 that is mounted on teleoperated manipulator arm 214.

There are other parts, cables, etc. associated with the da Vinci® Surgical System, but these are not illustrated in FIG. 2 to avoid detracting from the disclosure. Further information regarding minimally invasive surgical systems may be found for example in U.S. patent application Ser. No. 11/762,165 (filed Jun. 23, 2007; disclosing Minimally Invasive Surgical System), U.S. Pat. No. 6,837,883 B2 (filed Oct. 5, 2001; disclosing Arm Cart for Telerobotic Surgical System), and U.S. Pat. No. 6,331,181 (filed Dec. 28, 2001; disclosing Surgical Robotic Tools, Data Architecture, and Use), all of which are incorporated herein by reference.

In this aspect, an accelerometer is mounted on the distal portion of surgical instrument 215. The accelerometer is positioned proximal to and adjacent to a wrist joint. The accelerometer includes a cantilever beam and an optic fiber. The optic fiber is fixedly attached to a side of the cantilever beam. The optic fiber includes a first Fiber Bragg Grating. The first Fiber Bragg Grating is positioned adjacent a fixed end of the cantilever beam. In one aspect, the optic fiber also includes a second Fiber Bragg Grating. The second Fiber Bragg Grating is part of a force sensor.

The optic fiber is coupled to an interrogator unit 220. Interrogator unit 220 decodes the optically encoded acceleration information from the accelerometer into electrical signals compatible with the computer control hardware in system controller 230.

System controller 230 represents the various controllers in system 200. System controller 230 sends control commands to the slave surgical instrument in response to control commands. The control commands are based on movements of the masters in surgeon's control console 260 by surgeon 261. A display module 232 in system controller 230 also updates a stereoscopic view 262 of the surgical site generated by the display device in surgeon's control console 260 as the slave surgical instrument moves in response to the control commands. The control of the surgical instruments and the display of stereoscopic images is the same as in prior systems, except with respect to the vibro-tactile feedback as indicated herein, and so are not considered in further detail.

Although described as system controller 230, it is to be appreciated that system controller 230 may be implemented in practice by any combination of hardware, software that is executed on a processor, and firmware. Also, its functions, as described herein, may be performed by one unit, or divided up among different components, each of which may be implemented in turn by any combination of hardware, software that is executed on a processor, and firmware. When divided up among different components, the components may be centralized in one location or distributed across system 200 for distributed processing purposes.

The signals from interrogator 220 are processed by a vibro-tactile feedback module 231 in system controller 230. As explained more completely below, vibro-tactile feedback module 231 filters the signals from interrogator 220 and then sends output signals to a vibro-tactile feedback device mounted on the master tool grip in surgeon's control console 260. In response to the filtered signals, the vibro-tactile feedback device causes the master tool grip in the console 260 to vibrate in relation to the high frequency content of the interaction between the teleoperated surgical instrument and the surgical working environment detected by the accelerometer. Thus, surgeon 261 receives vibro-tactile feedback 263. In addition, vibro-tactile feedback module 231 can send another signal to an audible feedback device that in turn generates an audio sound corresponding to the high frequency content of the interaction between the teleoperated surgical instrument and the surgical working environment detected by the accelerometer. Vibro-tactile feedback module 231 may also generate signals that are sent to other components in the system controller. The audible feedback, vibro-tactile feedback, and system controller then provide information to surgeon 261 about the surgical instruments that enhances the surgeon's ability to perform the surgical procedure.

FIG. 3A is a perspective illustration of a surgical instrument 300. Arrow 395 shows the proximal direction and the distal direction in FIG. 3A.

Surgical instrument 300 includes a housing 301, a shaft 302, a force sensor and accelerometer apparatus 303, a joint 304, and an end component 305. End component 305, such as a surgical end effector, is coupled to force sensor and accelerometer apparatus 303 via joint 304, e.g., a wrist joint. Force sensor and accelerometer apparatus 303 is coupled to a distal end of a shaft 302 and is coupled to joint 304 in this aspect. Housing 301 is operably coupled to a proximal end of shaft 302, and housing 301 includes an interface which mechanically, electrically, and optically couples instrument 300 to an instrument manipulator assembly.

In one aspect of FIG. 3A, force sensor and accelerometer apparatus 303 is a separately manufactured unit that is coupled between the distal end of shaft 302 and joint 304 and that becomes part of shaft 302. In this aspect, force sensor and accelerometer apparatus 303 includes an outer cover that is seen in FIG. 3A. In another aspect, force sensor and accelerometer apparatus 303 is formed on a distal end portion shaft and is not a separately manufactured unit.

FIG. 3B is an enlarged diagram of one aspect of force sensor and accelerometer apparatus 303, sometimes referred to as apparatus 303. Apparatus 303 includes a force sensor and at least one accelerometer 320Y. Apparatus 303 includes a generally annular tube 306 operably coupled to a distal end of shaft 302 and operably coupled to a proximal body segment of joint 304. In one aspect, shaft 302 is a rigid shaft.

In this aspect, tube 306 includes a number of rectangular-shaped apertures 307 cut from tube 306 and a plurality of radial ribs 308 forming through passages for passage of actuation cables, wires, tubes, rods, and/or flushing fluids through tube 306. Each of plurality of radial ribs 308 extends lengthwise in a direction of the lengthwise axis of tube 306, the z-axis, and each radial rib of the plurality of radial ribs extends radially along a radius of tube 306 from the z-axis centerline of tube 306.

Also, in this aspect, a number of optic fibers 310, e.g., four optic fibers, are mounted on an outer surface of tube 306. In FIG. 3B, the four optic fibers are equally spaced, 90 degrees apart, around the outer surface of tube 306, and only two of the four optic fibers are visible in FIG. 3B. The ninety-degree spacing is illustrative only and is not intended to be limiting. For examples of other spacings between the optic fibers, see U.S. Patent Application Publication No. US 2009/0157092 A1 (filed Dec. 18, 2007), which is incorporated by reference.

Optic fibers 310 may be inlaid in grooves 311 that form part of the outer surface of tube 306, or in a depressed area that forms part of the outer surface of tube 306. In this example, the outer surface of shaft 302 also includes a plurality of grooves 314 for optic fibers 310.

Some of optic fibers 310 include three strain gauges 309, while others of optic fibers 310 include two strain gauges. In one aspect, the strain gauges 309 utilize Fiber Bragg Gratings. In FIG. 3B, each of the two visible optic fibers include three strain gauges, while each of the two optic fibers that are not visible include two strain gauges. The use of a particular number of strain gauges in each optic fiber is illustrative only and is not intended to be limiting. An optic fiber may contain one or more strain gauges.

A first set of strain gauges 309 are spaced equally, ninety degrees apart, around the outer surface of tube 306 at a first axial position so that the first set of strain gauges 309 form a first ring 312 of strain gauges. A second set of strain gauges 309 are spaced equally, ninety degrees apart, around the outer surface of tube 306 at a second axial position so that the second set of strain gauges 309 form a second ring 313 of strain gauges.

Each of strain gauges 309 in first ring 312 and in second ring 313 are oriented parallel to the lengthwise z-axis of tube 306 and are mounted on the outer surface over a rib 308 and between two apertures. If tube 306 did not include apertures, each of strain gauges 309 in first ring 312 and in second ring 313 are oriented parallel to the lengthwise z-axis of tube 306 and are mounted on the outer surface over a rib 308.

First ring of strain gauges 312 is mounted at a chosen distance from second ring of strain gauges 313 and the two rings are aligned so that strain gauges in a pair of stain gauges in the two rings are aligned with each other along the lengthwise z-axis. Low frequency forces applied to distal portions 305 and 304 along the X-axis and Y-axis can be determined using the plurality of strain gauges in rings 312 and 313. See U.S. Pat. No. 8,375,808 B2, which is incorporated by reference.

In this aspect, force sensor and accelerometer apparatus 303 includes two accelerometers 320Y and 320X. An optic fiber 310 extends from the force sensor unto a cantilever beam 315 with strain gauge 309 positioned near the fixed end of cantilever beam 315 in each of accelerometers 320Y and 320X. Accelerations in the Y-direction cause cantilever beam 315 of accelerometer 320Y to flex in the Y-direction, which in turn strains strain gauge 309. Thus, optic fiber 310 carries strain information for measurement of low frequency forces and strain information for measurement of high frequency accelerations.

In FIG. 3B, accelerometers 320X and 320Y are proximal to joint 304. However, in other aspects, the accelerometer or accelerometers are on joint 304 or on end component 305.

For example, in FIG. 3C, a portion of a different surgical instrument includes shaft 302, force sensor apparatus 303C, a joint 304C with accelerometer 320C, and end component 305. End component 305 is coupled to force sensor apparatus 303C via joint 304C, e.g., a wrist joint. Force sensor apparatus 303C is coupled to a distal end of a shaft 302 and is coupled to joint 304C in this aspect. In FIG. 3C, components with a reference numeral the same as a reference numeral in an earlier drawing are equivalent to components described with respect to the earlier drawings, and so that description is not repeated here.

Force sensor apparatus 303C includes two rings of strain gauges similar to rings 312 and 313 that were described above. Accelerometer 320C is positioned in a short body segment of joint 304C that is coupled to the distal end of force sensor apparatus 303C. Accelerometer 320C includes a strain gauge. The strain gauge can be in an extension of one of the optic fibers in force sensor apparatus 303C or can be in a dedicated optic fiber.

In FIG. 3D, a portion of yet another surgical instrument includes shaft 302, force sensor apparatus 303C, a wrist joint 304, and end component 305D. End component 305D includes an accelerometer 320D in one of the jaws of end component 305D. End component 305D is coupled to force sensor apparatus 303C via joint 304, e.g., a wrist joint. Force sensor apparatus 303C is coupled to a distal end of a shaft 302 and is coupled to joint 304 in this aspect. In FIG. 3D, components with a reference numeral the same as a reference numeral in an earlier drawing are equivalent to components described with respect to the earlier drawings, and so that description is not repeated here.

Accelerometer 320D includes a strain gauge. The strain gauge can be in an extension of one of the optic fibers in force sensor apparatus 303C or can be in a dedicated optic fiber. The optic fiber including the strain gauge of accelerometer 320D runs axially thru the instrument and intersects the transverse axis of a wrist pivot shaft (with a gap in the shaft for the fiber) when wrist joint 304 is in its neutral position. The optic fiber can move and bend without length change when wrist joint 304 pivots back and forth.

FIGS. 4A and 4B are illustrations of alternative implementations of a cantilever beam accelerometer with a Fiber Bragg Grating in an optic fiber that is positioned on a distal portion of surgical instrument 300. Accelerometer 420A (FIG. 4A) is formed in a wall of an annular tube, e.g., is formed on a portion of a body 406A. Accelerometer 420A includes a cantilever beam 415A and an optic fiber 410A. In this aspect, a first end 415A1 of cantilever beam 415A extends from body 406A in a direction of a lengthwise axis 419A. A mass 416A is attached to a second end 415A2 of cantilever beam 415A. In this aspect, cantilever beam 415A and mass 416A are a single integrated part. Cantilever beam 415A and mass 416A are positioned in an opening through a wall of body 406A.

An outer surface 407A of body 406A includes a groove 411A or a depressed region. An optic fiber 410A including a Fiber Bragg Grating 409A is affixed in, e.g., epoxied in, groove 411A. Fiber Bragg Grating 409A is positioned adjacent fixed end 415A1 of cantilever beam 415A. In this aspect, optic fiber 410A has a single core that includes Fiber Bragg Grating 409A.

Cantilever beam 415A with mass 416A is configured to have adequate deflection at accelerations experienced during surgical activities to provide a strain in Fiber Bragg Grating 409A. The strain is measurable with adequate signal to noise ratio for the resolution and the range of expected accelerations. In one aspect, content in a frequency range of 30 Hz to 1000 Hz are of interest, and more particularly content in a frequency range of 50 Hz to 200 Hz. The frequency range is selected so that realistic feedback can be provided to the surgeon with the particular surgical robot master control arm and/or master arm surgeon handgrip on surgeon's control console 260.

Also, cantilever beam 415A with mass 416A is configured to have a first mechanical resonance peak above the frequency content of the surgical activities and above that of any vibration induced accelerations and forces originating in the surgical robot, the support assembly of the surgical robot, and attached equipment. Also, the first mechanical resonance peak is sufficiently high to avoid creating an unstable feedback loop around any low frequency force output device attached to the surgical robot master control arm or to the master control arm surgeon handgrip. As is known to those knowledgeable in the field, to determine the resonance characteristics of the cantilever beam, the beam design typically is first modeled, either with hand calculations or a computer based finite element analysis, and then verified with experimental analysis.

Finally, in one aspect, cantilever beam 415A with mass 416A is configured to withstand mechanical shock (e.g. if the instrument is dropped on a floor) or excessively high intensity vibration (e.g. if beam 415A is excited by an unstable feedback control loop) either by its own strength or by an over travel stop feature(s) limiting deflection of cantilever beam 415A. Thus, in one aspect, accelerometer 420A includes a mechanical stop 417A to limit the range of motion of cantilever beam 415A in the direction towards the centerline axis 419A of body 406A. The sidewalls of the opening in body 406A surrounding cantilever beam 415A and mass 416A function as a mechanical stop also.

To obtain a good signal-to-noise ratio, several aspects of Fiber Bragg Grating 409A and optic fiber 410A are considered. First, optic fiber 410A with Fiber Bragg Grating 409A is mounted as far as possible from a neutral axis of bending 418A of the combination of cantilever beam 415A and optic fiber 410A to produce the greatest strain and strongest signal. As used herein, neutral axis of bending 418A is an axis along the length of cantilever beam 415A, which remains unstressed, neither compressed nor stretched when cantilever beam 415A is bent.

In one aspect, optic fiber 410A is a silica glass fiber and cantilever beam 415A is made of a high strength aluminum alloy (e.g., 7075-T6 aluminum). The modulus of elasticity of silica glass and the modulus of elasticity of the high strength aluminum alloy are both about 10,500 ksi. Thus, as shown in FIG. 4A, when optic fiber 410A is mounted in groove 410A in outer surface 407A of body 406A, neutral axis of bending 418A of the combination of cantilever beam 415A and optic fiber 410A is approximately the neutral axis of bending of cantilever beam 415A. Thus, optic fiber 410A with Fiber Bragg Grating 409A is displaced from neutral axis of bending 418A. In general, the fiber core with the Fiber Bragg Grating is located offset from the neutral axis of bending so that the Fiber Bragg Grating has axial strain when the beam bends in response to lateral accelerations of the instrument tip. This is true if the fiber core is offset from the beam's neutral axis, and the smaller the fiber modulus of elasticity compared to the beam modulus of elasticity, the more the beam dominates in the neutral axis of the combined assembly.

Another aspect affecting the quality of the reflected signal from Fiber Bragg Grating 409A is the length of Fiber Bragg Grating 409A. In this aspect, interrogator 220 detects a spectral location of a wavelength peak of the reflected light. If the length of Fiber Bragg Grating 409A is too short, a broader peak of reflected light is obtained and the strain induced offset of the wavelength peak is a smaller fraction of the peak width resulting in less certain peak shift measurement and a poorer signal to noise ratio.

The strain at any point along Fiber Bragg Grating 409A is a function of the bending moment on the cantilever beam at that point and therefore depends on the distance between mass 416A and that point of Fiber Bragg Grating 409A. Thus, Fiber Bragg Grating 409A experiences a range of strains and reflects light of a range of wavelengths. If the length of Fiber Bragg Grating 409A is too large a fraction of the length of the cantilever beam 415A, the detected wavelength peak is broader due to chirp. Chirp is the variation of strain along Fiber Bragg Grating 409A. Again, the strain induced offset of the wavelength peak is a smaller fraction of the peak width resulting in less certain peak shift measurement and a poorer signal to noise ratio.

Thus, the length of Fiber Bragg Grating 409A is selected so that the peak broadening effects of a shorter length and of the chirp induced broadening in a longer length Fiber Bragg Grating on an end loaded cantilever beam are of similar magnitude and the overall peak broadening effect is minimized. This allows interrogator 220 to more accurately determine the location of the peak in both the strained and unstrained states so that the difference in the locations of the peaks can be used to ascertain the acceleration experienced by cantilever beam 415A.

Accelerometer 420B (FIG. 4B) includes an outer surface 407B of a body 406B and an optic fiber 410B. Optic fiber 410B includes Fiber Bragg Gratings 409B. The location of the light conducting cores and Fiber Bragg Gratings with respect to the neutral axis of bending of the fiber optic cantilever beam is described below. Body 406B is, for example, an annular tube.

In this aspect, a first portion of the optic fiber 410B is fixedly attached, e.g., epoxied, in a groove 411B or a depressed region in surface 407B. The first portion of the optic fiber 410B is adjacent to, but does not include Fiber Bragg Gratings 409B.

A second portion of optic fiber 410B extends from the first portion and is configured as cantilever beam 415B. The second portion of optic fiber 410B includes Fiber Bragg Gratings 409B.

In this aspect, a first end 415B1 of cantilever beam 415B extends away from body 406B in a direction of a lengthwise axis into an opening 421B through a wall of body 406B. A mass 416B is attached to a second end 415B2 of cantilever beam 415B.

Fiber Bragg Gratings 409B are positioned adjacent first end 415B1 of cantilever beam 415B. Typically, when optic fiber 410B is epoxied in groove 411B, an epoxy meniscus is formed around optic fiber 410B. The epoxy meniscus extends into opening 421B. Thus, the start of cantilever beam 415B is not coincident with the edge of opening 421B in this case. The effect of the epoxy meniscus is considered when positioning Fiber Bragg Gratings 409B prior to affixing optic fiber 410B in groove 411B so that Fiber Bragg Gratings 409B are near first end 415B1 of cantilever beam 415B, but not exactly at first end 415B1 of cantilever beam 415.

Herein, when it said that a Fiber Bragg Grating is positioned near an end of a cantilever beam or adjacent a fixed end of a cantilever beam, it means that the Fiber Bragg Grating is positioned so that when the cantilever beam deflects, all of the Fiber Bragg Grating is strained. If the Fiber Bragg Grating is positioned too close to the first end of the cantilever beam, a portion of the Fiber Bragg Grating would not be strained when the cantilever beam deflects and so the Fiber Bragg Grating would be further chirped, which broadens the reflected light peak, as described above. Similarly, if the Fiber Bragg Grating is positioned too far from the first end of the cantilever beam, the moment arm between the Fiber Bragg Grating and the effect of the mass is diminished, which diminishes the response of the accelerometer. Thus, the Fiber Bragg Grating is placed as close as possible to the first end of the cantilever beam without incurring chirping due to an unstrained portion of the Fiber Bragg Grating.

In this aspect, optic fiber 410B is a multi-core fiber. FIG. 4C is a cross-sectional illustration of cores 410B1, 410B2, and 410B3 of optic fiber 410. Each of cores 410B1, 410B2, and 410B3 is positioned at a different vertex of an equilateral triangle 436 centered on a cross section of optic fiber 410B. The black dot in FIG. 4C represents neutral axis of bending 418B, which is also the centerline axis of optic fiber 410B. FIG. 4C shows that each of cores 410B1, 410B2, and 410B3 is displaced from centerline neutral axis of bending 418B. Also, each of cores 410B1, 410B2, and 410B3 includes a Fiber Bragg Grating. Herein, a single cantilever beam 415B is described, but actually each of the three cores undergoes strain when cantilever beam 415B is deflected. Thus, by combining the strains from all three Fiber Bragg Gratings, cantilever beam 415B can provide the magnitude and direction of accelerations in all transverse directions. In one aspect, a matrix known to those knowledgeable in the field is used to transform the three strain signals into acceleration.

Again, cantilever beam 415B with mass 416B is configured to have adequate deflection at accelerations experienced during surgical activities to provide a strain in two or three of Fiber Bragg Gratings 409B. The strain is measurable with adequate signal to noise ratio for the resolution and the range of expected accelerations. In one aspect, frequencies in a range of 30 Hz to 1000 Hz are of interest, and more particularly frequencies in a range of 50 Hz to 200 Hz. The range of frequencies is selected so that realistic feedback can be provided to the surgeon with the particular surgical robot master control arm and master arm surgeon handgrip on surgeon's control console 260.

Also, cantilever beam 415B with mass 416B is configured to have a first mechanical resonance peak above the frequency content of the surgical activities and above that of any vibration induced accelerations and forces originating in the surgical robot, the support assembly of the surgical robot and attached equipment. Also, the first mechanical resonance peak is sufficiently high to avoid creating an unstable feedback loop around any force output device attached to the surgical robot master control arm or to the master arm surgeon handgrip. Again, as is known to those knowledgeable in the field, to determine the resonance characteristics of the cantilever beam, the beam design typically is first modeled, either with hand calculations or a computer based finite element analysis, and then verified with experimental analysis.

Finally, in one aspect, cantilever beam 415B with mass 416B is configured to withstand mechanical shock (e.g. if the instrument is dropped on a floor) or excessively high intensity vibration (e.g. if cantilever beam 415B is excited by an unstable feedback control loop) either by its own strength or by an over travel stop feature(s) limiting deflection of cantilever beam 415B. Thus, in one aspect, accelerometer 420B includes a mechanical stop 417B to limit the range of motion of cantilever beam 415B in the direction towards the centerline of body 406B. The sidewalls of the opening surrounding cantilever beam 415B and mass 416B function as a mechanical stop also.

To obtain a good signal-to-noise ratio, the cores with Fiber Bragg Gratings 409B are mounted as far as possible from a neutral axis of bending 418B of the cantilever beam 415B portion of optic fiber 410B to produce the best signal. Another aspect affecting the quality of the reflected signal from Fiber Bragg Grating 409B is the length of Fiber Bragg Gratings 409B. In this aspect, interrogator 220 detects shifts in the locations of respective wavelength peaks of the reflected light. If the length of Fiber Bragg Gratings 409B is too short, broader peaks of reflected light are obtained relative to the wavelength shift and the signal to noise ratio of the output from interrogator 220 is poorer.

The strain on each of Fiber Bragg Gratings 409B is a function of the distance between mass 416B and that Fiber Bragg Grating. Thus, if each of Fiber Bragg Gratings 409B is too long, different parts of that Fiber Bragg Grating experience different strains and so reflect light having a broader spectrum of wavelengths, i.e., the Fiber Bragg Grating is chirped. This again results in a broader reflected peak of light that does not have as clear a peak, and so again the output of interrogator 220 has a poorer signal to noise ratio.

Thus, the length of Fiber Bragg Gratings 409B is selected so that in unstrained and strained states the Fiber Bragg Grating provides a reflected light wavelength peak with a definitive peak location. This allows interrogator 220 to accurately determine the location of the peak in both the unstrained and strained states so that the difference in the peak locations can be used to ascertain the acceleration experienced by cantilever beam 415B.

In the above examples of a cantilever beam accelerometer at the distal end of a surgical instrument, the free end of the cantilever beam was distal to the fixed end of the cantilever beam. This is illustrative only and is not intended to be limiting. FIG. 5A is a diagram of one aspect of a portion of a force sensor and accelerometer apparatus 503A, sometimes referred to as apparatus 503A. Apparatus 503A includes a force sensor and at least one accelerometer 520A. Apparatus 503A includes a generally annular tube 506A that can be operably coupled to a distal end of shaft 302 and that can be operably coupled to a proximal body segment of joint 304. In one aspect, shaft 302 is a rigid shaft.

In this aspect, tube 506A does not include a number of rectangular-shaped apertures, but does include a plurality of radial ribs forming through passages for passage of actuation cables, wires, tubes, rods, and/or flushing fluids. The plurality of radial ribs are equivalent to plurality of radial ribs 308 that was described above, and so instead of repeating the description, the description of plurality of radial ribs 308 is incorporated by reference.

Again, in this aspect, a number of optic fibers 510A1, 510A2, e.g., four optic fibers, are mounted on an outer surface of tube 506A. The four optic fibers are spaced equally, 90 degrees apart, around outer surface 507A of tube 506A, but only portions of two of the four optic fibers are shown in FIG. 5A. The ninety-degree spacing is illustrative only and is not intended to be limiting. For examples of other spacings between the optic fibers, see U.S. Patent Application Publication No. US 2009/0157092 A1 (filed Dec. 18, 2007).

Each of optic fibers 510A1, 510A2 includes at least one strain gauge 509A1, 509A2 that is used in low frequency force sensing, as described with respect to FIG. 3B. Optic fibers 510A1, 510A2 may be inlaid in grooves that form part of outer surface 507A of tube 506A, or in a depressed area that forms part of outer surface 507A of tube 506A.

In this aspect, force sensor and accelerometer apparatus 503A includes at least one accelerometer 520A. Optic fiber 510A1 extends unto a cantilever beam 515A with strain gauge 509A5 positioned near a fixed end 515A1 of cantilever beam 515A. Thus, optic fiber 510A1 carries strain information for measurement of low frequency forces and strain information for measurement of accelerations.

In this aspect, cantilever beam 515A extends from first end 515A1 in a proximal direction away from a distal end of body 506A towards second end 515A2. Second end 515A2 is the free end of cantilever beam 515A and is connected to mass 516A. Thus, in this example, second end 515A2 of cantilever beam 515A is proximal to first end 515A1 of cantilever beam 515A. The distal and proximal directions are represented by arrow 595. The design and function of accelerometer 520A is equivalent to that described above with respect to accelerometer 420A.

FIG. 5B is a diagram of one aspect of a portion of a force sensor and accelerometer apparatus 503B, sometimes referred to as apparatus 503B. Apparatus 503B includes a force sensor and at least one accelerometer 520B. Apparatus 503B includes a generally annular tube 506B that can be operably coupled to a distal end of shaft 302 and that can be operably coupled to a proximal body segment of joint 304. In one aspect, shaft 302 is a rigid shaft.

In this aspect, tube 506B does not include a number of rectangular-shaped apertures, but does include a plurality of radial ribs forming through passages for passage of actuation cables, wires, tubes, rods, and/or flushing fluids. The plurality of radial ribs are equivalent to plurality of radial ribs 308 that was described above, and so instead of repeating the description, the description of plurality of radial ribs 308 is incorporated by reference.

Again, in this aspect, four optic fibers are mounted on an outer surface 507B of tube 506B. The four optic fibers are equally spaced, 90 degrees apart, around outer surface 507A of tube 506A, but only portions of two of the four optic fibers are shown in FIG. 5B. The ninety-degree spacing is illustrative only and is not intended to be limiting. For examples of other spacings between the optic fibers, see U.S. Patent Application Publication No. US 2009/0157092 A1 (filed Dec. 18, 2007).

Each of optic fibers 510B1, 510B2 includes at least one strain gauge 509B1, 509B2 that is used in low frequency force sensing, as described with respect to FIG. 3B. Optic fibers 510B1, 510B2 may be inlaid in grooves that form part of outer surface 507B of tube 506B, or in a depressed area that forms part of outer surface 507B of tube 506B.

In this aspect, force sensor and accelerometer sensor apparatus 503B includes at least one accelerometer 520B. A first portion of the optic fiber 510B1 is fixedly attached, e.g., epoxied, in a groove or a depressed region in surface 507B. The first portion of the optic fiber 510B1 is adjacent to, but does not include Fiber Bragg Gratings 509B5.

A second portion of optic fiber 510B1 extends from the first portion and is configured as cantilever beam 515B. The second portion of optic fiber 510B1 includes Fiber Bragg Gratings 509B5. In this aspect, optic fiber 510B1 is a multi-core fiber that is equivalent to optic fiber 410B.

In this aspect, cantilever beam 515B extends from first end 515B1 in a proximal direction away from the distal end of body 506B towards second end 515B2 Second end 515B2 is the free end of cantilever beam 515B and is connected to mass 516A. Thus, in this example, free end 515B2 is proximal to fixed end 515B1. The distal and proximal directions are represented by arrow 595. Fiber Bragg Gratings 509B5 is positioned adjacent first end 515B1 of cantilever beam 515B. The design and function of accelerometer 520B is equivalent to that described above with respect to accelerometer 420B that was described above.

Figure 6A:
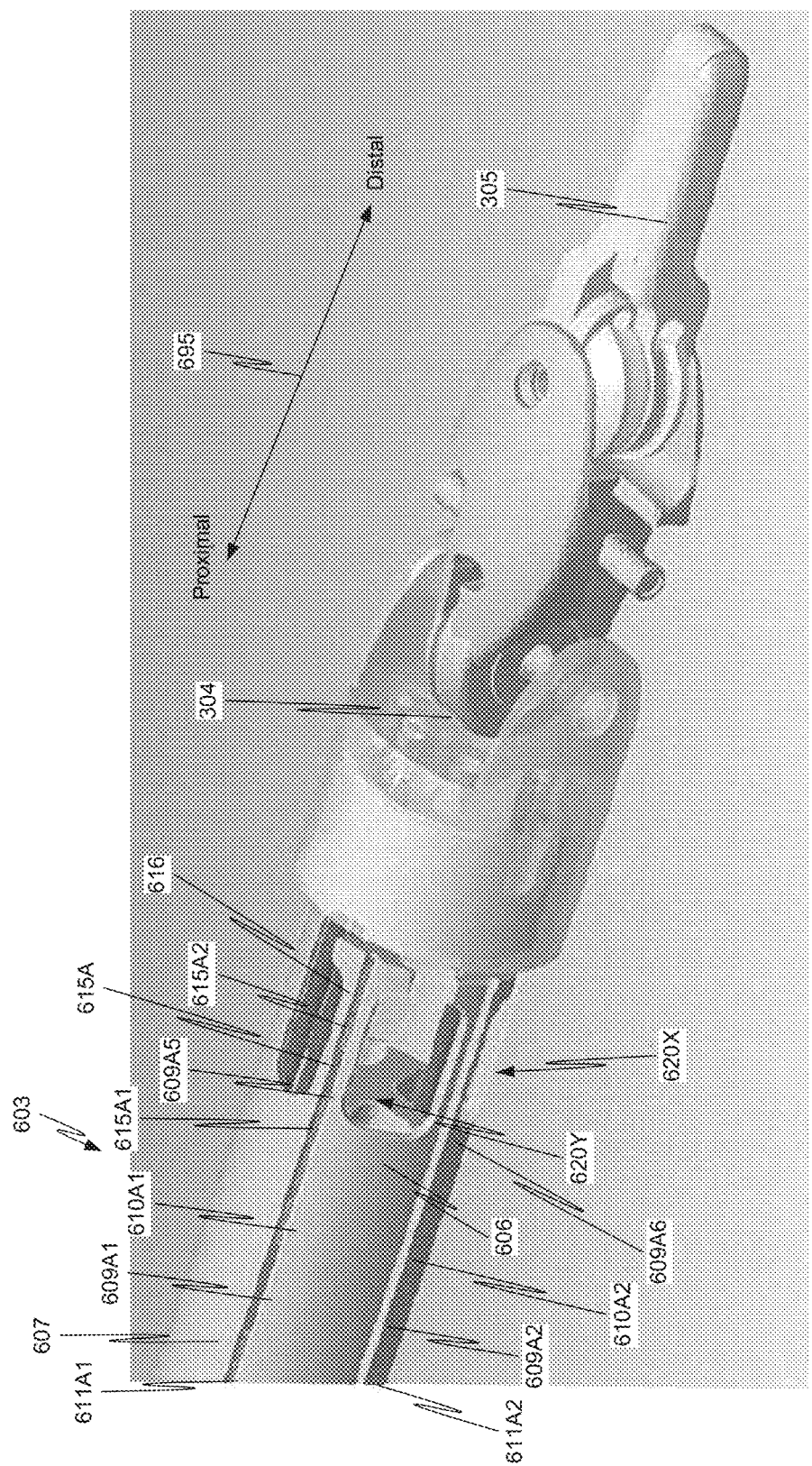
FIG. 6A is an illustration of another aspect of a distal portion of a surgical instrument that includes a force sensor and accelerometer apparatus.
Figure 6B:
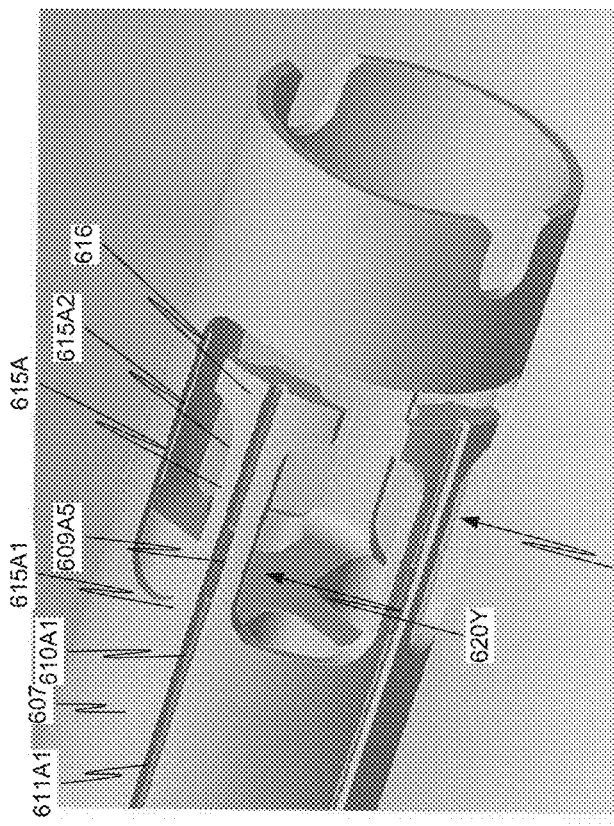
FIG. 6B is an enlarged view of the distal end of the force sensor and accelerometer apparatus of FIG. 6A.
Figure 6C:
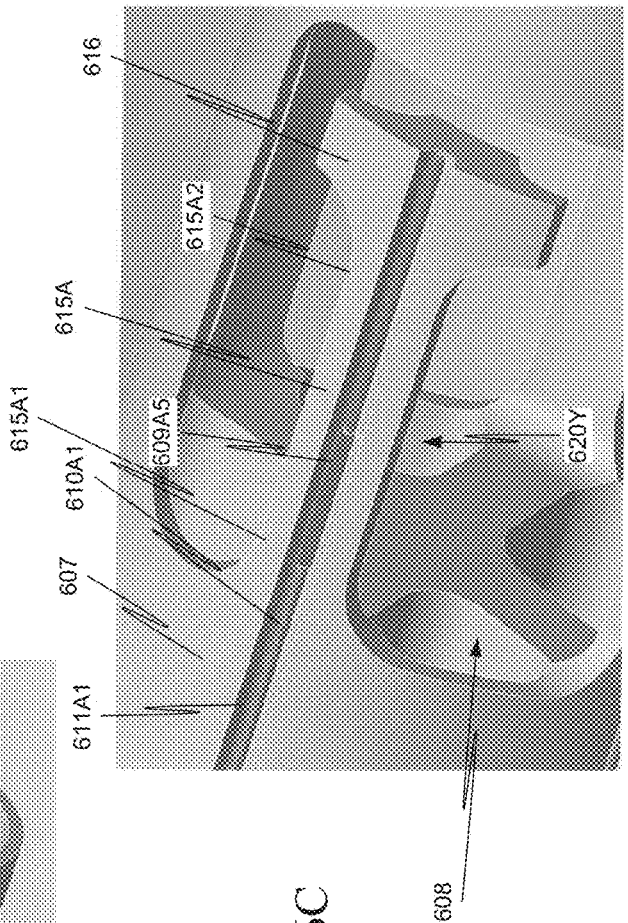
FIG. 6C is an enlarged view of the accelerometer of FIGS. 6A and 6B.

FIG. 6A is a diagram of one aspect of a portion of a surgical instrument that includes a force sensor and accelerometer apparatus 603, sometimes referred to as apparatus 603. FIG. 6B is an enlarged view of the distal end of force sensor and accelerometer apparatus 603. FIG. 6C is an enlarged view of accelerometer 620Y. In FIG. 6A, components with a reference numeral the same as a reference numeral in an earlier drawing are equivalent to components described with respect to the earlier drawings, and so that description is not repeated here.

Apparatus 603 includes a force sensor and two accelerometers 620X and 620Y. Apparatus 603 includes a generally annular tube 606 that in this aspect is part of the shaft of the surgical instrument. Alternatively, as described above, apparatus 603 can be a separately manufactured unit that can be operably coupled to a distal end of shaft 302 and that can be operably coupled to a proximal body segment of joint 304.

The distal end of apparatus 603 is connected to a joint 304 that in turn is connected to an end component 305. Thus, apparatus 603 is proximal to and adjacent to joint 304. In particular, accelerometers 620X and 620Y of apparatus 603 are proximal to and adjacent to joint 304.

In this aspect, tube 606 does not include a number of rectangular-shaped apertures exposing a plurality of internal ribs, but tube 606 does include a plurality of radial ribs 608 forming through passages for passage of actuation cables, wires, tubes, rods, and/or flushing fluids. Plurality of radial ribs 608 are equivalent to plurality of radial ribs 308 that was described above, and so instead of repeating the description, the description of plurality of radial ribs 308 is incorporated by reference. Of course, in another aspect, tube 606 may not include the plurality of radial ribs.

Again, in this aspect, a number of optic fibers including optic fibers 610A1, 610A2, e.g., four optic fibers, are mounted on an outer surface 607 of tube 606. The four optic fibers are spaced equally, 90 degrees apart, around outer surface 607 of tube 606, but only portions of two of the four optic fibers are shown in FIG. 6A. The ninety-degree spacing is illustrative only and is not intended to be limiting. For examples of other spacings between the optic fibers, see U.S. Patent Application Publication No. US 2009/0157092 A1 (filed Dec. 18, 2007).

Each of optic fibers 610A1, 610A2 includes at least one strain gauge 609A1, 609A2 that is used in low frequency force sensing, as described with respect to FIG. 3B. Optic fibers 610A1, 6510A2 may be inlaid in grooves 611A1, 611A2 that form part of outer surface 607 of tube 606 or in a depressed area that forms part of outer surface 607 of tube 606. In one aspect, each of the four optic fibers includes a single core.

In this aspect, accelerometers 620X and 620Y have the same physical configuration, and so only accelerometer 620Y is described. Optic fiber 610A1 extends onto a cantilever beam 615A with Fiber Bragg Grating strain gauge 609A5 positioned near a first end 615A1 of cantilever beam 615A. Thus, optic fiber 610A1 carries strain information for measurement of low frequency forces and strain information for measurement of accelerations.

In this aspect, cantilever beam 615A extends from first end 615A1 in a distal direction away from body 606 towards second end 615A2, the free end, which is connected to mass 616A. Thus, in this example, second end 615A2 of cantilever beam 615A is distal to first end 615A1 of cantilever beam 615A. The distal and proximal directions are represented by arrow 695. The design and function of accelerometer 620X and of accelerometer 620Y is equivalent to that described above with respect to accelerometer 420A.

Figure 7A:
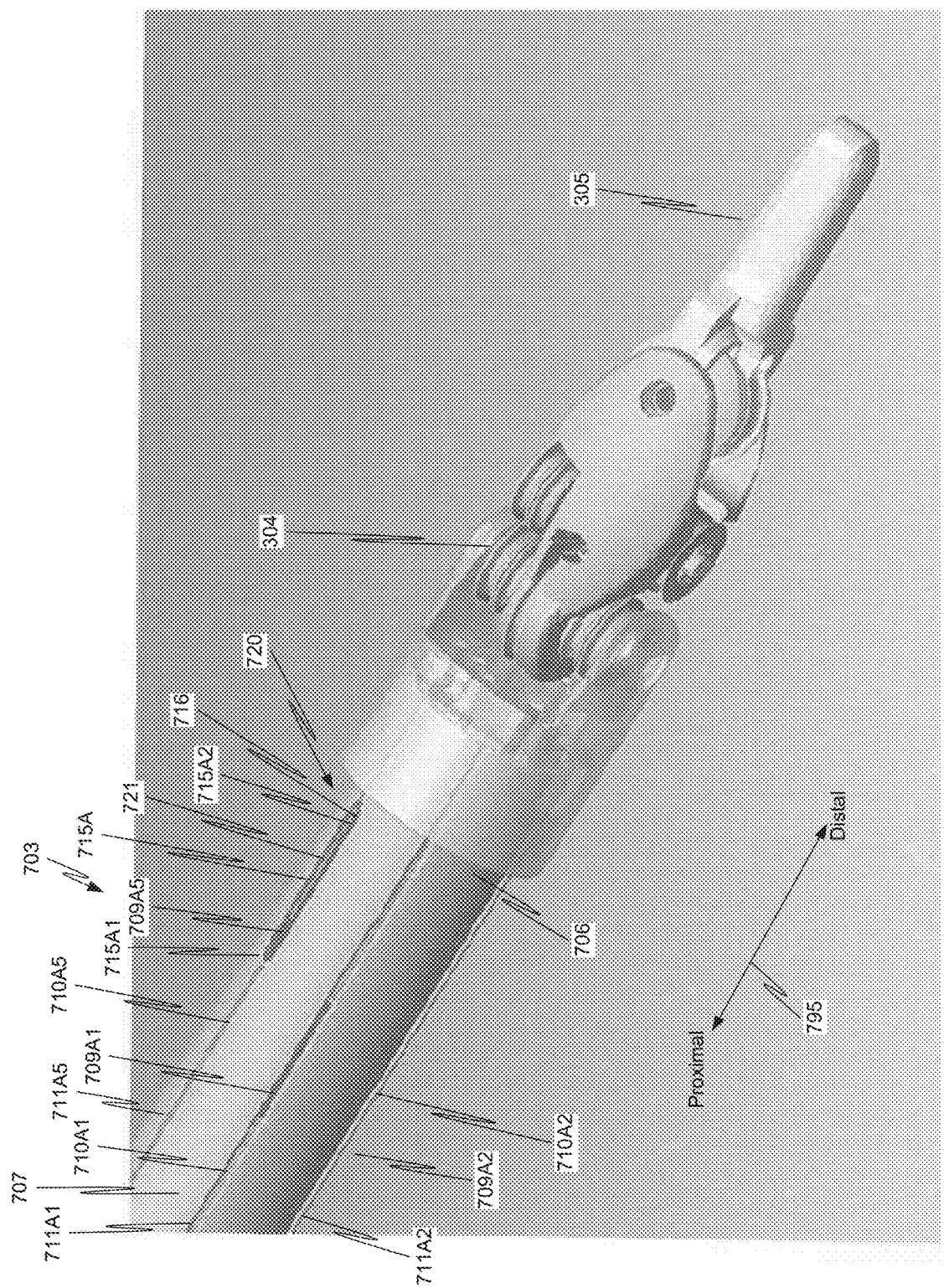
FIG. 7A is a diagram of yet another aspect of a distal portion of a surgical instrument that includes a force sensor and accelerometer apparatus where the optic fiber is configured as a cantilever beam.
Figure 7B:
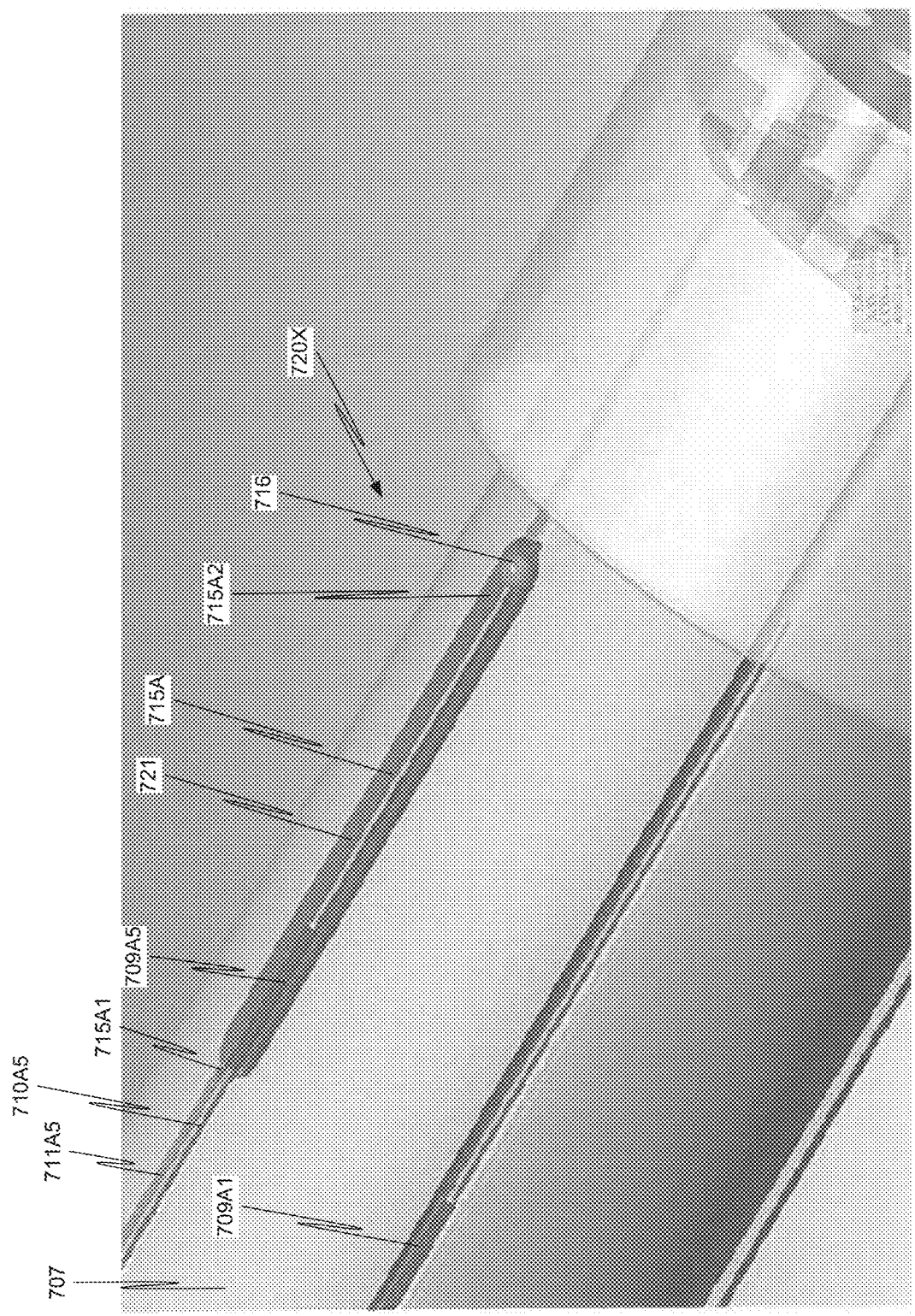
FIG. 7B is an enlarged view of the accelerometer of FIG. 7A.

FIG. 7A is a diagram of one aspect of a portion of a surgical instrument that includes a force sensor and accelerometer apparatus 703, sometimes referred to as apparatus 703. FIG. 7B is an enlarged view of accelerometer 720Y. In FIG. 7A, components with a reference numeral the same as a reference numeral in an earlier drawing are equivalent to components described with respect to the earlier drawings, and so that description is not repeated here.

Apparatus 703 includes a force sensor and at least one accelerometer 720. Apparatus 703 includes a generally annular tube 706 that, in this aspect, is part of the shaft of the surgical instrument. Alternatively, as described above, apparatus 703 can be a separately manufactured unit that can be operably coupled to a distal end of shaft 302 and that can be operably coupled to a proximal body segment of joint 304.

The distal end of apparatus 703 is connected to a joint 304 that in turn is connected to an end component 305. Thus, apparatus 703 is proximal to and adjacent to joint 304. In particular, accelerometer 720 of apparatus 703 is proximal to and adjacent to joint 304.

In this aspect, tube 706 does not include a number of rectangular-shaped apertures exposing a plurality of internal ribs, but tube 706 does include a plurality of radial ribs forming through passages for passage of actuation cables, wires, tubes, rods, and/or flushing fluids. The plurality of radial ribs are equivalent to plurality of radial ribs 308 that was described above, and so instead of repeating the description, the description of plurality of radial ribs 308 is incorporated by reference. Of course, in another aspect, tube 706 may not include the plurality of radial ribs.

Again, in this aspect, a number of optic fibers including optic fibers 710A1, 710A2, e.g., four optic fibers, are mounted on an outer surface 707 of tube 706. The four optic fibers are spaced equally, 90 degrees apart, around outer surface 707 of tube 706, but only portions of two of the four optic fibers are shown in FIG. 7A. The ninety-degree spacing is illustrative only and is not intended to be limiting. For examples of other spacings between the optic fibers, see U.S. Patent Application Publication No. US 2009/0157092 A1 (filed Dec. 18, 2007).

Each of optic fibers 710A1, 710A2 includes at least one strain gauge 709A1, 709A2 that is used in low frequency force sensing, as described with respect to FIG. 3B. Optic fibers 710A1, 710A2 may be inlaid in grooves 711A1, 711A2 that form part of outer surface 707 of tube 706 or in a depressed area that forms part of outer surface 707 of tube 706.

In this aspect, force sensor and accelerometer apparatus 703 includes at least one accelerometer 720. In this aspect, a first portion of optic fiber 710A5 is fixedly attached, e.g., epoxied, in a groove 711A5 or a depressed region in surface 707. In this example, a dedicated optic fiber 710A5 is used for accelerometer instead of one of the optic fibers 710A1, 710A2 used in the force sensor.

The first portion of the optic fiber 710A5 is adjacent to, but does not include Fiber Bragg Grating 709A5. A second portion of optic fiber 710A5 extends from the first portion and is configured as cantilever beam 715A. Cantilever beam 715A is positioned in a slot 721, e.g., an opening through the wall of tube 706. In this aspect, optic fiber 710A5 is a multi-core fiber that is equivalent to optic fiber 410B.

In this aspect, cantilever beam 715A extends from first end 715A1 in a distal direction towards second end 715A2. Second end 715A2 is the free end of cantilever beam 715A and is connected to mass 716A. Thus, in this example, second end 715A2 of cantilever beam 715A is distal to first end 715A1 of cantilever beam 715A. The distal and proximal directions are represented by arrow 795. Fiber Bragg Grating 709A5 is positioned adjacent first end 715A 1 of cantilever beam 715A. The design and function of accelerometer 720 is equivalent to that described above with respect to accelerometer 420B that was described above.

Each of the accelerometers described herein is packaged in a minimum physical volume and in an orientation consistent with the available space near the surgical instrument tip and consistent with the running direction of the other optical fiber strain sensors. In each accelerometer, the Fiber Bragg Grating is used singly without provision for temperature compensation since high pass filtering of the signal eliminates slower or direct current (DC) offset due to thermal drift.

Figure 8:
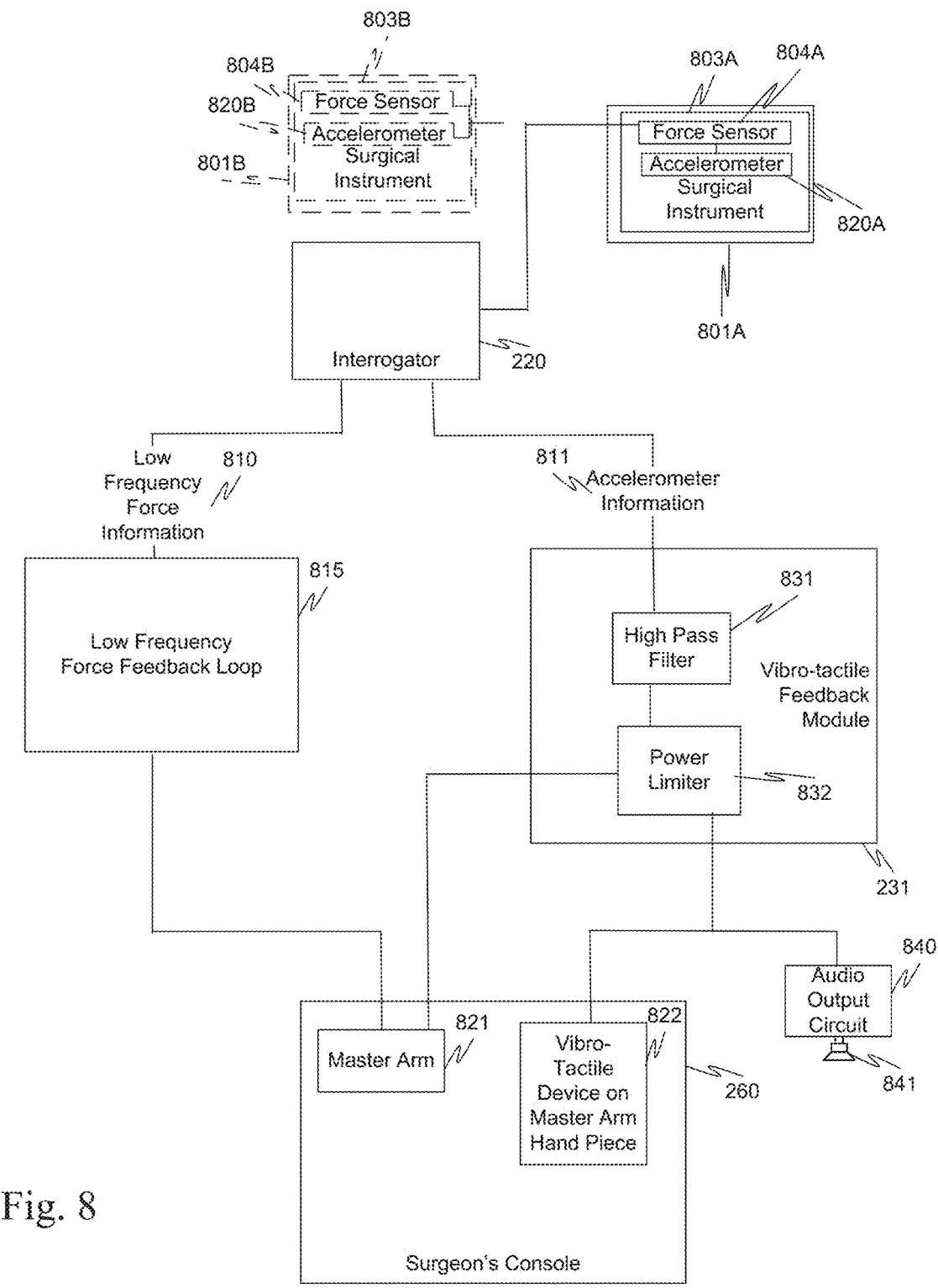
FIG. 8 is a block diagram illustrating the processing of the information generated by each of the force sensor and accelerometer apparatuses described herein.

FIG. 8 is a block diagram illustrating the processing of the information generated by each of the force sensor and accelerometer apparatuses described above. As described above, two different apparatuses can be used and connect to interrogator 220. A first apparatus 801A includes a surgical instrument 803A that in turn includes a force sensor 804A and an accelerometer 820A. Force sensor 804A and accelerometer 820A are equivalent to any of those described above with respect to FIGS. 4A, 5A, and 6A to 6C where the strain sensor in accelerometer 820A is in series with a strain sensor in force sensor 804A. A second apparatus 801B (shown by dotted lines because apparatus 801B is not connected to interrogator 220 in this example) includes a second surgical instrument 803B that in turn includes a force sensor 804B and an accelerometer 820B. Force sensor 804B and accelerometer 820B are equivalent to any of described above with respect to FIGS. 4B, 5B, and 7A to 7B, where the strain sensor in accelerometer 820B is in parallel with strain sensors in force sensor 804B.

The reflected light from the Fiber Bragg Gratings in force sensor 804A and the Fiber Bragg Grating in accelerometer or accelerometers 820A of surgical instrument 801A is changed into digital low frequency force information 810 and digital accelerometer information 811.

Figure 9:
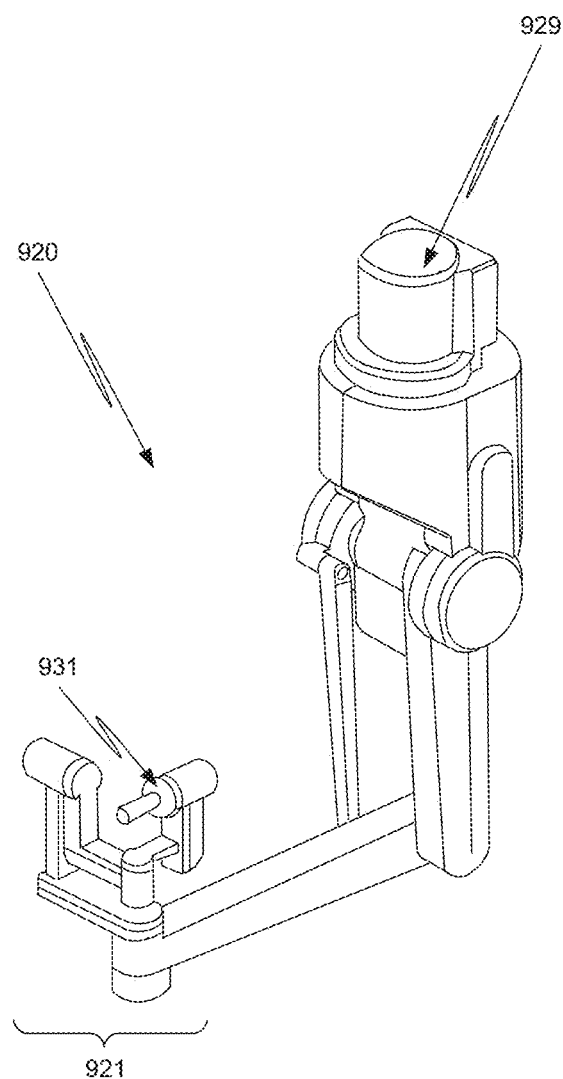
FIG. 9 is an illustration of a master tool manipulator that includes a base, a master tool grip, and a vibro-tactile feedback module coupled to the master tool grip.

Low frequency force information 810 is processed by a low frequency force feedback loop module 815, sometimes referred to as module 815. In response to information 810, module 815 low pass filters information 810 to generate feedback signals that are applied to a master arm 821 in surgeon's console 260. The force feedback on master arm 821 provides an indication to the surgeon of the force being applied by a surgical instrument. FIG. 9 is an illustration of a master tool manipulator 920 that is an example of master arm 821. Master tool manipulator 920 includes a base 929 and a master tool grip 921.

Accelerometer information 811 includes high frequency information about the interaction between the robotic surgical instrument and the surgical working environment. However, accelerometer information 811 may also include low frequency information such as a DC offset due to temperature changes of the acceleration sensing Fiber Bragg Grating. The high frequency information about the interaction between the robotic surgical instrument and the surgical working environment can be acquired transient strain information and/or acquired sustained time varying strain information.

Acceleration information 811 is first received by high pass filter module 831. High pass filter module 831 high pass filters the accelerometer information. For example, high pass filter module attenuates signals having a frequency less than 50 Hz in one example and attenuates signals having a frequency less than 30 Hz in another example. Since the thermal effect on the Fiber Bragg Grating in accelerometer 820A is a DC offset to the output signal from accelerometer, high pass filter module 831 eliminates the DC offset and so eliminates any temperature effects on the signals output from accelerometer 820A. In addition, the high pass filtering minimizes interaction with low frequency force feedback loop 815 that outputs feedback information from an accompanying low frequency force transducer on surgical robot master arm 821. The output from high pass filter module 831 is input to a power limiter module 832 in vibro-tactile feedback module 231.

Power limiter module 832 is configured to limit the power sent to the vibro-tactile output device 822 on master arm hand piece, i.e., limit master arm hand piece feedback. The goal of the power limiter is to limit the size of the control signal sent to the audio output 840, the vibro-tactile device 822, and/or the master arm 821 such that each device is not being asked to actuate outside of its intended range. The intended range may be specified by limits on the hardware or may be set by the desired application.

Power limiter module 832 can be implemented in a number of ways. For example, power limiter module 831 can limit the amplitude of signals passed through module 831. Alternatively, power limiter module 832 can be configured as a low pass filter that attenuates signals having frequencies above a maximum frequency of interest for vibro-tactile feedback, e.g., above 200 Hz. In another aspect, power limiter module 832 is configured as a fixed frequency cut-off filter so that signals having frequencies above a maximum frequency of interest for vibro-tactile feedback are effectively blocked from passing through power limiter module 832. Alternatively, any combination of these implementations of power limiter module 832 could be used to limit passing signals above the frequency range of surgical interest and to prevent any detrimental feedback effect involving accelerometer 820A and the vibro-tactile device. Additionally, if multiple accelerometers exist on the force sensor and accelerometer apparatus 303, the power limiter may combine multiple accelerometer signals into a single signal.

The output from the power limiter module 832 drives a real time direct vibro-tactile haptic output device 822 attached to the surgical robot master hand piece, gimbal, or finger grip levers2. In FIG. 9, vibro-tactile haptic output device 931 is mounted on master tool grip 921. A hardware amplifier may exist between the high pass filter 832 and the vibro-tactile device 822 or the vibro-tactile device may have a self-contained amplifier.

Vibro-tactile output device 931, for example, includes a voice coil motor and movable counter mass attached to the master tool grip 921 where the forces induced by acceleration of the counter mass are felt on the surgeon's fingertips. This permits output of higher frequency content of the forces exerted on the robotic surgical instrument tip than may be output by attempting to move entire master manipulator assembly 920 itself. Movement of entire master manipulator assembly 920 is more suited to output of the lower frequency content of sensed instrument tip forces from low frequency force feedback loop 815.

Optionally, the output from the power limiter module 832 is sent to the master arm. The master arm adds the output from the high pass filter 832 to the output of the low frequency force feedback loop 815. The master arm outputs both the low frequency force signal and the high frequency acceleration signals to the surgeon. The high pass filter output 832 may be sent to only one motor of the master arm, e.g. the distal roll axis on the master tool grip 921, which is better suited to output the high frequency content rather than outputting the high frequency content via the entire master arm.

Optionally, the output from high pass filter 832 is input to an audio output circuit 840 that in turn drives speaker 841. Speaker 841 co-displays the acquired time varying strain information as an acoustic signal audible to the surgeon and/or other operating room staff in real time.

While above the operation of the elements in FIG. 8 was described with respect to apparatus 801A with surgical instrument 803A, the description is also directly applicable when apparatus 801B with surgical instrument 803B is used. Thus, the description of FIG. 8 is not repeated with apparatus 801B connected to interrogator 220 in place of apparatus 801A.

The above description and the accompanying drawings that illustrate aspects and embodiments of the present inventions should not be taken as limiting—the claims define the protected inventions. Various mechanical, compositional, structural, electrical, and operational changes may be made without departing from the spirit and scope of this description and the claims. In some instances, well-known circuits, structures, and techniques have not been shown or described in detail to avoid obscuring the invention.

Further, this description's terminology is not intended to limit the invention. For example, spatially relative terms-such as "beneath", "below", "lower", "above", "upper", "proximal", "distal", and the like—may be used to describe one element's or feature's relationship to another element or feature as illustrated in the figures. These spatially relative terms are intended to encompass different positions and orientations of the device in use or operation in addition to the position and orientation shown in the figures. For example, if the device in the figures is turned over, elements described as "below" or "beneath" other elements or features would then be "above" or "over" the other elements or features. Thus, the exemplary term "below" can encompass both positions and orientations of above and below. The device may be otherwise oriented (rotated 90 degrees or at other orientations) and the spatially relative descriptors used herein interpreted accordingly.

The singular forms "a", "an", and "the" are intended to include the plural forms as well, unless the context indicates otherwise. The terms "comprises", "comprising", "includes", and the like specify the presence of stated features, steps, operations, elements, and/or components but do not preclude the presence or addition of one or more other features, steps, operations, elements, components, and/or groups.

All examples and illustrative references are non-limiting and should not be used to limit the claims to specific implementations and embodiments described herein and their equivalents. Any headings are solely for formatting and should not be used to limit the subject matter in any way, because text under one heading may cross-reference or apply to text under one or more headings. Finally, in view of this disclosure, particular features described in relation to one aspect or embodiment may be applied to other disclosed aspects or embodiments of the invention, even though not specifically shown in the drawings or described in the text.

Embodiments described above illustrate but do not limit the invention. It should also be understood that numerous modifications and variations are possible in accordance with the principles of the present invention. Accordingly, the scope of the invention is defined only by the following claims.

We claim:

1. A medical device, comprising:
   a surgical instrument including a shaft, a distal end component coupled to the shaft, and an accelerometer;
   wherein the shaft includes a distal end portion and an opening in the distal end portion of the shaft;
   wherein the accelerometer includes a cantilever beam and a strain sensor located on the cantilever beam; and
   wherein the cantilever beam extends from the shaft into the opening in the distal end portion of the shaft and includes a strain sensor located on the cantilever beam.

2. The medical device of claim 1, wherein:
   the shaft includes a tube;
   the tube includes a wall; and
   the opening in the distal end portion of the shaft extends through the wall of the tube.

3. The medical device of claim 1, wherein:
   the shaft includes a proximal end portion;
   a centerline axis of the shaft is defined between the proximal end portion of the shaft and the distal end portion of the shaft; and
   the cantilever beam is arranged to flex towards the centerline axis of the shaft within the opening in the distal end portion of the shaft.

4. The medical device of claim 1, wherein:
   the shaft includes a proximal end portion;
   a centerline axis of the shaft is defined between the distal-proximal end portion of the shaft and the distal end portion of the shaft;
   the cantilever beam is arranged to flex towards the centerline axis of the shaft within the opening in the distal end portion of the shaft; and
   the accelerometer includes a stop feature positioned to limit deflection of the cantilever beam.

5. The medical device of claim 1, wherein:
   the shaft includes a proximal end portion;
   a centerline axis of the shaft is defined between the proximal end portion of the shaft and the distal end portion of the shaft;
   the cantilever beam is arranged to flex towards the centerline axis of the shaft within the opening in the distal end portion of the shaft;
   a sidewall at least in part defines the opening in the distal end portion of the shaft; and
   a stop feature formed in the sidewall is positioned to limit deflection of the cantilever beam.

6. The medical device of claim 1, wherein:
   the shaft includes a proximal end portion;
   a centerline axis of the shaft is defined in a direction between the proximal end portion of the shaft and the distal end portion of the shaft; and
   the cantilever beam extends from the shaft in the direction of the centerline axis.

7. The medical device of claim 6, wherein:
   the direction of the centerline axis is oriented proximally.

8. The medical device of claim 6, wherein:
   the direction of the centerline axis is oriented distally.

9. The medical device of claim 1, wherein:
   the shaft includes a proximal end portion;
   a centerline axis of the shaft is defined in a direction between the proximal end portion of the shaft and the distal end portion of the shaft;
   the cantilever beam includes a first end and a second end opposite the first end;
   the cantilever beam extends from the first end of the cantilever beam at the shaft in the direction of the centerline axis; and
   the second end of the cantilever beam is a free end positioned in the opening in the distal end portion of the shaft.

10. The medical device of claim 1, wherein:
    the shaft includes a proximal end portion;
    a centerline axis of the shaft is defined in a direction between the proximal end portion of the shaft and the distal end portion of the shaft;
    the cantilever beam includes a first end and a second end opposite the first end;
    the accelerometer includes a mass at the second end of the cantilever beam;
    the cantilever beam extends from the first end of the cantilever beam at the shaft in the direction of the centerline axis; and
    the mass is positioned in the opening in the distal end portion of the shaft.

11. The medical device of claim 1, wherein:
    the shaft includes a proximal end portion;
    a centerline axis of the shaft is defined in a direction between the proximal end portion of the shaft and the distal end portion of the shaft;
    the cantilever beam extends from the shaft in the direction of the centerline axis;
    a neutral axis of bending is defined for a combination of the cantilever beam and the strain sensor; and
    the strain sensor is offset from the neutral axis of bending.

12. The medical device of claim 1, wherein:
    the medical device includes an optic fiber that extends onto the cantilever beam; and
    the strain sensor includes a fiber Bragg grating formed in the optic fiber.

13. The medical device of claim 1, wherein:
    the medical device includes an optic fiber that extends onto the cantilever beam;
    the strain sensor includes a fiber Bragg grating formed in the optic fiber;
    the shaft includes a proximal end portion;
    a centerline axis of the shaft is defined in a direction between the proximal end portion of the shaft and the distal end portion of the shaft;
    the cantilever beam extends from the shaft in the direction of the centerline axis;

a neutral axis of bending is defined for a combination of the cantilever beam and the optic fiber; and the strain sensor is offset from the neutral axis of bending.

14. The medical device of claim 1, wherein:

the distal end component is configured to interact with tissue.

* * * * *